(12) United States Patent
Tufty et al.

(10) Patent No.: US 6,697,879 B1
(45) Date of Patent: *Feb. 24, 2004

(54) COMPUTER IMPLEMENTED VIRTUAL SENSOR OBJECT AND TANGIBLE MEDIUM UTILIZING SAME

(75) Inventors: Robert Mitchell Tufty, Rockville, MD (US); J. Bryan Blundell, 912 Grandin Ave., Rockville, MD (US) 20851

(73) Assignee: J. Bryan Blundell, Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/365,830

(22) Filed: Aug. 3, 1999

Related U.S. Application Data

(63) Continuation of application No. 08/709,078, filed on Sep. 6, 1996, now Pat. No. 6,223,214.

(51) Int. Cl.[7] .......................... G06F 17/40; G06F 15/16
(52) U.S. Cl. ...................... 709/316; 709/201; 709/207; 700/65
(58) Field of Search ................................ 709/217, 208, 709/213, 315, 316, 201, 202, 203; 700/65

(56) References Cited

U.S. PATENT DOCUMENTS

| 5,125,091 A | 6/1992 | Staas, Jr. et al. | |
|---|---|---|---|
| 5,479,614 A | 12/1995 | Aoe et al. | |
| 5,509,123 A | 4/1996 | Dobbins et al. | 395/200.15 |
| 5,519,867 A | 5/1996 | Moeller et al. | 395/700 |
| 5,560,005 A | 9/1996 | Hoover et al. | 395/600 |
| 5,649,107 A | 7/1997 | Kim et al. | 395/200.11 |
| 5,650,936 A | 7/1997 | Loucks et al. | 364/483 |

OTHER PUBLICATIONS

"An Object Oriented Intelligent Control Architecture," Lynch et al., Tulane University, (Jun. 24, 1992).
"A Generic Model For Smart Sensors Based Data Acquisition System," Ehrlich et al., Laboratorire Central des Ponts et Chaussees, vol. 2718.
"Remote Interrogation and Control of Sensors Via the Internet," Fuhr et al., University of Vermont. (12/95).
"Remote Monitoring of Instrumented Structures Using the INTERNET Information Superhighway," Fuhr et al., University of Vermont (1994).

*Primary Examiner*—Dung C. Dinh
(74) *Attorney, Agent, or Firm*—Irah H. Donner; Hale and Dorr LLP

(57) ABSTRACT

A computer implemented Virtual Sensor Object includes an abstract class of Objects, and an actual software instantiation of which performs an abstract observation, evaluation, and expression method in either a static, a synchronous, or an asynchronous Form. The evaluation method of the Virtual Sensor Object allows the substantive meaning of the observations to be expressed in a Form which clarifies the Substance of the observations, so that the substantive meaning of the observations may be perceived directly, with little or no cognitive interpretation being required. The methods of expression and evaluation are dependent on the observation, whereas they are independent as to how they use and express meaning.

27 Claims, 24 Drawing Sheets

COMPUTER IMPLEMENTED VIRTUAL SENSOR OBJECT AND TANGIBLE MEDIUM UTILIZING SAME

RELATED APPLICATIONS

This application is a continuation of U.S. application Ser. No. 08/709,078, filed Sep. 6, 1996, U.S. Pat. No. 6,223,216 which is incorporated herein by reference.

TECHNICAL FIELD

The present invention generally relates to the field of information management and more particularly relates to a paradigm and conceptual framework for cognitive perception, by clarifying the substantive meaning of quantitative measurements which are made in relation to either a physically observable, or a virtually conceivable, event, or series of events.

BACKGROUND ART

A problem and areas of concern regarding the preservation of historic artifacts and sites.

RECENT INCENTIVE

Beginning in 1989, we became increasingly involved in the local, national and international preservation community. Through this involvement with historic house museums, and museums housed in modern buildings, we became increasingly concerned that the methods of monitoring museum conditions, relating to the preservation of historic artifacts, were not very informative and, in many ways, were of limited or little use. Buildings are generally complex environments and housing collections of artifacts within a building increases that complexity many times. Looking into environmental monitoring revealed that methods and procedures being used were generally not very informative. Monitoring locations were few and generally not well placed in regards to efficient data collection. The data collected was generally displayed on x-y axis charts or in columnar table format. The data was generally shown as independent information without relationship to anything other than time.

In 1990, we were involved in a one day workshop concerning the various ways a structure can be monitored. The workshop was called "Monitoring of Structures—Why, How and . . . ". The two main purposes of the workshop were (1) to show practitioners within the Historic Preservation community basic ways to look at and monitor a structure and (2) to have a panel discussion of some of the false standards that many people believed they should be achieving with their monitoring programs.

In preparation for this workshop, we contacted many representatives and manufacturers of monitoring equipment, to learn about their systems and the information that could be provided. The amazing thing that was discovered was that to achieve any complex monitoring program (most monitoring programs should have some levels of complexity—looking for relationships as well as independent and dependent conditions) many different methods of data collection needed to be used, including different types of equipment. Along with, and on top of this, would be the difficulty of viewing the different types of data collected and turning it into something useful that the individuals involved with the structures could understand and use.

Over the next few years there was increased contact with other individuals involved in the investigation of the conditions of structures. Repeatedly the issues that came up were: (1) How toil best monitor a condition? and (2) What relevant information could be gleaned out of the accumulated data.

It was hard to know how to correctly interpret much of the data. If many locations were monitored, it would be difficult to work out the relationships and influences between points. Usually more questions than answers came up. Usually there were questions of what else might be happening within a structure that could have influenced the data. The need to standardize the collection and interpretation process was important. The huge commercial niche of manufacturers that build monitoring systems made it possible to use very, sophisticated instruments and techniques. The problem was that many times the more sophisticated methods and data only caused more confusion and misinterpretation of the data. The individual points of data were becoming more precise which meant they were interpreted as truth even when the real question as to what they meant had not been worked out. The more individual points of data became important, without the understanding of the relationships between points of data, the worse the situation became. We imagined using the power of the computer to be able to standardize and simplify the ability of individuals to view data in a graphically easy way to interpret symbols. This would allow individuals to look for influences and relationships rather than get lost in the data itself.

Many times there were real needs and value for installing a monitoring system at a historic site. In these situations, efforts were made to influence the historic site into installing a monitoring system. After the historic site would check with other sites as to the success and value of their efforts at monitoring, the usual response would be that there appears to be low added value and high added costs related to monitoring systems. This gets back to the method of collecting data and how the data is viewed and interpreted.

Later, during 1992–1995, as research continued into the monitoring of structures, arrangements were worked out with several prominent sites to install monitoring systems using portable data logging units. Each site had its unique conditions and needs. The sites included:

textiles at the Smithsonian Institute's Museum of American History including the Star Spangled Banner; Gunston Hall in Lorton, Va., George Mason's colonial home and at George Washington's Mount Vernon, the Family Tomb including the sarcophagi of George and Martha Washington.

Each site was different from the others in the way management and conservation decisions were made. Each site was a different type of structure with unique problems and conditions that needed to be understood. Each site had its own range of independent and dependent conditions that needed to be tracked or monitored to effectively understand the items that were of concern.

From observations made during the monitoring efforts, we have determined basic problems in monitoring conditions within complex systems. For example, each site has a diverse and complex set of conditions that are independent and dependent of each other. It is the ability to identify the relationships that occur that provide the instructive information. The difficulty in reviewing the data that is collected is the inability to evaluate the relationships that exist. The result from data collection is the accumulation of information usually in numerical form. The data is usually represented in columnar tables or x-y graph form. This method of comprehending data is difficult for individuals to use. Even people experienced with reviewing data in this format have difficulty maintaining enough active information to develop even a simplistic view of relationships.

There are systems available for viewing particular data streams from particular data logging equipment. However, there are real limits to these systems when the desire is to use various types of collected data to view conditions and discover relationships of conditions. The data may come from human observations, instrument readings, instruments connected to data loggers, and existing sources of information. Each system for collecting and viewing data has different formats and requirements.

We have determined that this very process, of collecting and viewing data, itself introduces a level of complexity that makes the main reason for collecting the data, looking for relationships, even more difficult. The method of data collection needs to be presented in an orderly manner, and, equally important, in the terms that allow for an informed dialog to occur. We have also determined that the viewing, collecting, and analyzing of the data is facilitated inn an object-oriented application format.

Defining An Object

The classic discussions of Plato and Aristotle, circa 350 BC, introduced, a distinction between perceiving the Form of an Object verses perceiving the Substance of an Object. We speak of the "substantive meaning" of an event, thing, or Object. Upon reflection, the terminology inherent in the phrase "substantive meaning" implies that the Substance of an Object is the true and complete measure of an Object and what the Object means, does, or affects by its existence. In a philosophical sense, discussion of the Substance of an Object speaks to the deepest nature of an Object within the physical, emotional, intellectual, and spiritual realms, in a most profound sense. In the senses limited to the physically observable realm, discussion of the Substance of an Object speaks to what may be measured in a standard manner, according to all standard dimensional scale of units or measurement.

In either sense, it is true that a given Substance may be manifested in numerous physical Forms. While numerous Objects may have Forms that are strongly analogous, the respective Substances of such Objects may be very different in terms of what the Objects are, do, cause, or affect. For example, a pure Substance, such as pure water, may be manifested in the Form of fog, rain, snow, etc.

The problem of recognizing and knowing the Substance of an Object is ancient and is addressed, firstly, by observation of the Object and the recording of quantitative measurements which describe the activity, or lack of activity, of the Object. As scientific understanding of natural phenomena has grown, so have the number and variety of quantitative measurements which may be observed and recorded as digitized information. In ancient times, this problem of the knowledge of Substance was bounded by the knowledge of what could be measured. Beyond the immediate scientific recording of sensor information, today, if variation is observed in a process, then a digital Value can be assigned whether the value is subjective or objective in nature. Rene Descarte long ago established the utility of a coordinate system and measurement set of reference axis for calibrating the dimensional extent of Objects.

Mathematical Foundations

The development of a Calculus of Indications in 1969, by G. Spencer-Brown, formalized and clarified the concept of a Boolean Arithmetic which involves both real and imaginary Boolean Values. By the very nature of the forms used to manifest said Boolean Arithmetic, it became clear that ancient discussion of Form and Substance should be revisited from a mathematical perspective, with specific attention to the implementation of computer programming languages and systems.

The first programming languages utilized the concepts of so-called, "real" Boolean values and "Truth Tables" in a very limited and hierarchical manner. With the advent of the so-called "Object-Oriented" programming languages such as SmallTalk, Modula, C++, and Eiffle, the programming languages finally assumed a form which allows the full spectrum of features and implications of said Boolean Arithmetic to be utilized within a computer-implemented system. In turn, said Boolean Arithmetic provides a complete mathematical paradigm for the distinction of Objects in CyberSpace because all assertions, regarding a computer-implemented process, must be evaluated within the context of the said Boolean Arithmetic. The Form and Substance of CyberSpace Objects is, thusly, considered from this perspective. In particular, it allows the Substance of a CyberSpace Object to be represented as digital information. The Form of CyberSpace Objects speaks to the existence, interaction, inheritance, and autonomy of the Objects.

Current State of Technology

Current technology allows measurements to be observed by both analog and digital electronic probe devices. Analog-to-dilgital converters blur the distinction with regards to a source for the generation of actual digitized information. In addition, conceptual models of quantitative processes may also generate digitized information to reflect the state of their process, over time. In modern times, the problem of clarifying the knowledge of Substance is bounded by the volume of measurements which can be processed in a timely and efficient manner.

Over the past three decades, computers have addressed the problem with parallel efforts in hardware and software development. Interestingly, most hardware advances focus on reliable processing speed and storage capacity, while software advances focus on formal aspects of syntax, scope, semantics, and Form. Modern software has evolved through several Forms of manifestation, including assembly code,1 block structured languages, non-procedural languages, and finally the so-called "Object Oriented" systems. This evolution has likewise paralleled an increased understanding of the underlying mathematical Forms which govern the modern paradigm of calculation and expression processing Beginning with SmallTalk, advanced programming languages have embraced: an "Object Oriented" approach to software over the past decade and have achieved an industrial presence as exemplified by languages such as Forth, C++, Visual C++, Eiffle, and Java, among others. In a practical sense, the term CyberSpace is used to refer to a universe of virtual Objects which may interact among themselves within the physical apparatus known as the Internet, and all such Internet capable devices, whether or not they are actively connected to the InterNet.

The language of CyberSpace speaks of Objects which exist as Virtual Objects. The Objects are Virtual in the sense and the spirit that they have no physical existence beyond the realm of Cyberspace. Ultimately, CyberSpace and the Objects therein are merely an interpretation, within the Intellectual Realm, of various electronic signals being sent over a network of computers, and enabling devices of display and expression. However, the intellectual interpretation is underpinned by said Boolean Arithmetic and truly reflects the Form of Distinction of said Boolean Arithmetic.

A distinction in Cyberspace defines an Object which is distinct from the remainder of CyberSpace. Such Objects may be iteratively distinguished with respect to each other to an arbitrary degree. From such a distinction of Objects within CyberSpace, we have determined that Classes of Objects may, likewise, be distinguished. A distinction of the Form and Substance of such an Object may be made with respect to the existence of the Object. Thus, within the virtual reality of CyberSpace, we have determined that:

the Class of an Object is to the Form of said Object, it is also that:

an actual instance of said Object is to the Substance of the Object.

Beyond the bounds of CyberSpace, an actual instance of said Object is merely perceived and understood in an intellectual realm to behave and conform according to various intellectual rules and standards, or methods of behavior. In this case, the phrase "intellectual rules and standards" suggests a mathematical framework for evaluating the relationships which may exist among Classes of Objects. The Class of an Object is thus distinguished by the rules and standard of behavior to which it conforms, and a distinction is indicated.

Accordingly, we have determined that the Form of a Class of Objects may be extended to include new methods and give rise to the Form of a new Class of Objects. Because each Class is distinct, the issue of inheritence arises as to the methods which are passed from the parent Class to the child Class as an extension of the parent Class. Amusingly, there is a strong analogy between the rules and Forms of inheritence between Classes and the rules and Forms of inheritence implicit in the treatment of independent and dependent claims within 37 CFR 1.75 and related sections.

Further, the Substance of Object may only persist over time if the Object posseses a private memory or storage capability, in contrast to the public memory which is the remainder of CyberSpace. This raises the issue of communication between Objects within CyberSpace. In this regard, CyberSpace is considered as a medium where signal messages may be exchanged between Objects. The message exchange may follow either a procedural or exception-driven processing protocol, whereas this distinction of protocols conforms to the Form of said Boolean Arithmetic.

SUMMARY OF THE INVENTION

It is a feature and advantage of the present invention to provide a practical solution to perceiving the substantive meaning of measurements, represented as digitized information, in regard to an actual physical or virtually conceptual, event, or series of events.

It is another feature and advantage of the present invention to efficiently distinguish and organize the Form and Substance of a Virtual Sensor relating to the autonomous processing of the Virtual Sensor.

It is another feature and advantage of the present invention to provide a Graphic User Interface which allows and supports the construction of Sensor Objects from the standard libraries of ObservationMethod Objects and ExpressionMethod Objects.

It is another feature and advantage of the present invention to clarify an intellectual design or generic framework where it is structured in such a way as to allow a yet unspecified set of specifications to be processed. The assumption of the underlying CyberSpace enable such structure to be constructed as virtual forms which are conformed or transformed into actual forms at a later time, and then instantiated as an Object of Substance.

It is another feature and advantage of the present invention to clarify the substantive Variables and Methods inherent in an observation process and formalize the Variables and Methods as a class of Object, called the Observation-Method Object Class, which inherently supports the Variables and Methods.

It is another feature and advantage of the present invention to provide a library of common ObservationMethod Objects to serve as a standard library of means for observation of the digitized information of the Virtual Sensor, whereby access to a wide variety of digitized information, in a wide variety of conventional file and CyberSpace Object formats, is actively and immediately supported.

It is another feature and advantage of the present invention to provide a library of common ObservationMethod Objects to serve as an example library of techniques to allow synchronous or asynchronous access to any file or Object, which may be addressed by a Universal Resource Locator (URL), and its derivative forms, including, but not limited to, Telnet, FTP, etc.

It is another feature and advantage of the present invention to clarify the substantive Variables and Methods inherent in an expression process and formalize the Variables and Methods as an abstract class of Object, called the ExpressionMethod Object Class, which inherently supports the Variables and Methods.

It is another feature and advantage of the present invention to provide a library of common ExpressionMethod Objects to serve as a standard library of means for expressing the substantive meaning, of the digitized information of the Virtual Sensor, within various device contexts.

It is another feature and advantage of the present invention to provide a Graphic User Interface which allows and supports the dynamic construction of complete Expression-Method Objects.

It is another feature and advantage of the present invention to clarify the substantive Variables and Methods inherent in an evaluation process and formalize the Variables and Methods as an abstract class of Object, called the EvaluationMethod Object Class, which inherently supports the Variables and Methods.

It is another feature and advantage of the present invention to provide a library of common EvaluationMethod Objects to serve as a standard library of means for evaluating the substantive meaning, of the digitized information of the Virtual Sensor, with respect to established averages, ranges of possible value, and other statistical quantities and formulas which relate to, and describe the behavior of, the target event, or series of events, and conditions, or series of conditions.

It is another feature and advantage of the present invention to provide a library of common EvaluationMethod Objects to serve as an example library of techniques to demonstrate software programming techniques for a variety of statistical methods, which may serve as the basis for more advanced statistical analysis and rendering specification.

It is another feature and advantage of the present invention to formulate the nature of the EvaluationMethod.class Object such that a so-called "Null Evaluation" Method may exist for any defined RenderingMethod.class Object Method. This allows arbitrary binary information to be passed directly through from the sensor device to the expression device, without interpretation It is another feature and an advantage of the current invention that for each RenderingMethod.class Object, it is possible to construct a so-called "Identity" Expression-Method.class Object by pairing the RenderingMethod.class Object with the "Null" EvaluationMethod.class Object, so as to form a single pair rendering expression. For all such "Identity" ExpressionMethod.class Objects, the rendering will be directly, immediately, and exactly be determined by the observation readings.

It is another feature and advantage of the present invention to clarify the substantive Variables and Methods inherent in a rendering process and formalize the Variables and Methods as a class of Object, called the RenderingMethod Object Class, which inherently supports the Variables and Methods.

It is another feature and advantage of the present invention to provide a library of common RenderingMethod Objects to serve as a standard library of means for rendering a physical manifestation which corresponds to the result of the corresponding EvaluationMethod Object, within the ExpressionMethod Object of the Virtual Sensor. It is another feature and advantage of the present invention to provide a library of common RenderingMethod Objects to serve as an example library of techniques to demonstrate the use of commercially available "Abstract Windows Toolkit" techniques for visual expression via a Graphic User Interface, and other techniques for expression via virtual device drivers which may, in turn, control any variety of devices which may be controlled via the stream of the digitized information which results from the corresponding EvaluationMethod Object, within the ExpressionMethod Object of the Virtual Sensor.

It is another feature and advantage of the present invention to provide a Graphic User Interface which allows and supports the construction of SiteProfile Objects as a collection of Sensor Objects.

It is another feature and advantage of the present invention to provide a Graphic User Interface which allows and supports the construction of ExpressionMethod Objects from the standard libraries of EvaluationMethod Objects and RenderingMethod Objects. This allows for a standard library of expressions to be constructed from a standard library of renderings and evaluations.

After proper analysis of the methods of collecting data, we determined that any method of collecting data and then ascertaining the meaning of the data, should be represented as a "Virtual Sensor". This Virtual Sensor is formulated as an Object, and consists of several components which are also formulated as Objects. A critical characteristic of such CyberSpace Objects is that they have independent and dependent relationships with each other.

The first of these components is to determine the information that needs to be collected, how is it observed and what is the system for recording the observation. The second component is to determine how to evaluate questions regarding the collected data, such as "Does the information represent an advantageous or disadvantageous condition?" The last component of a Virtual Sensor is to define a method of expressing, or otherwise displaying, the data in a form that is easily comprehended. Accordingly, we have determined the following definitions and features of data collectors:

Sensor: an entity that comprises a Probe which is capable of Observation, Evaluation, and Expression.

Probe: an entity that appraises a condition with a unit of measure that conforms to the reason for measuring.

Observation: a method that establishes rules for measuring a condition to produce a reading that can be recorded in accordance with those rules.

Evaluation: a method of reviewing readings from a method of measuring and determining its state based on a set of norms appropriate for the readings.

Expression: a method of rendering, in symbolic forms appropriate to the sensor, the information which has been observed and evaluated.

In light of new advances in modern computers and programming systems and the above mentioned components which comprise the process of sensing, it is appropriate to seek a formal mathematical paradigm which simulates this logical process of observation and expression, thus clarify correct and useful perception.

In view of this current state of the technology, we have found that the transformation of a conventional. Probe device into a Virtual Sensor Object within the CyberSpace environment suggests that the Virtual Sensor Object should address the above issues of inheritance, memory, and the exchange of messages. As a general strategy for addressing these issues with respect to a specific Class of Objects, construct a Class such that an Object instance of said Class may function as a self-contained entity within CyberSpace, to the greatest degree possible.

DESCRIPTION OF THE PREFERRED EMBODIMENTS

Figure 1:
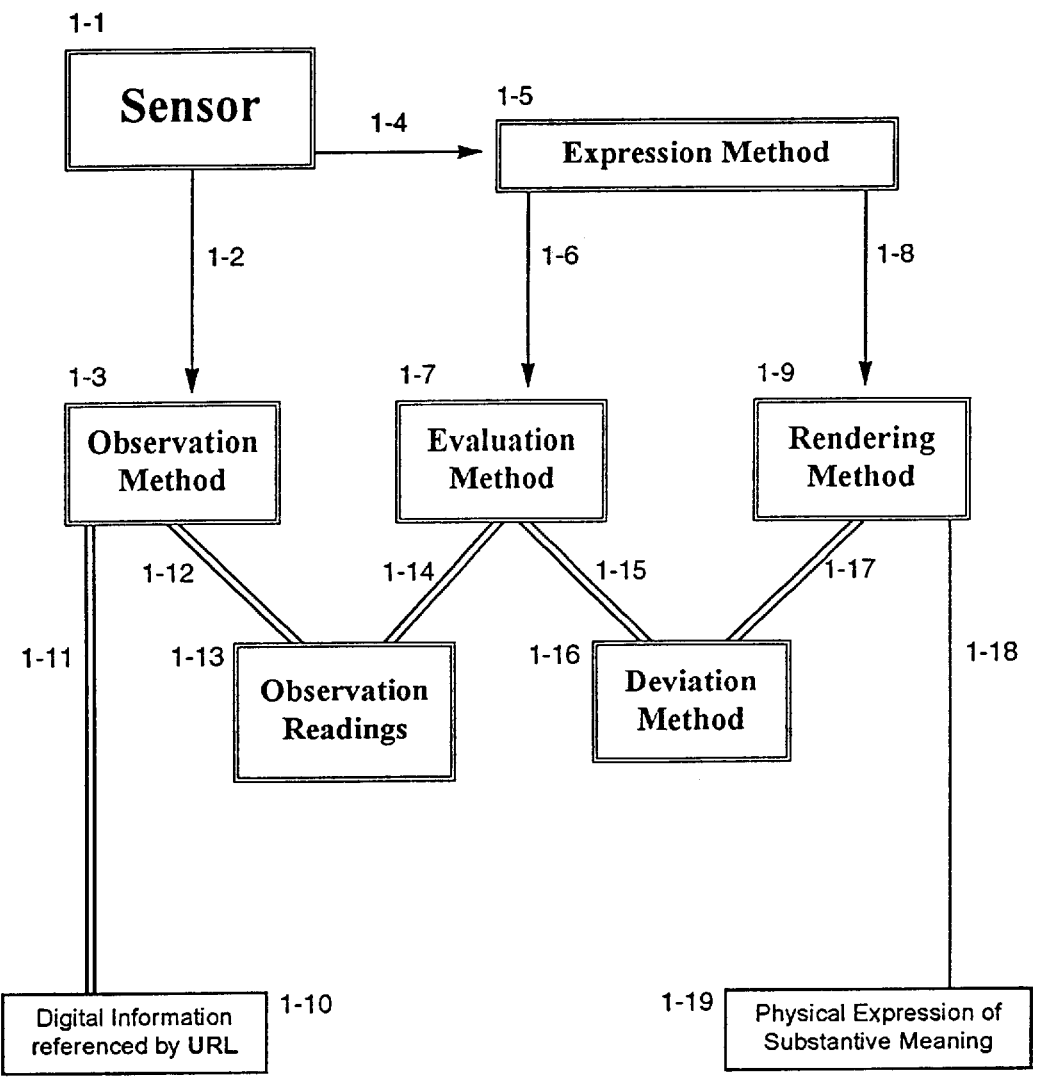
FIG. 1 is a graphic rendering of a Sensor.class Object and the associated component Objects.

The present invention is based on the problem of perceiving the substantive meaning of large quantities of digitized information related to the observation of actual or virtual phenomena. By discovering the Form and Substance of the abstract Objects and Methods of sentient observation, expression, evaluation, and rendering, a Virtual Sensor Object may be instantiated to express the substantive meaning of digitized information in the most natural and effective mode possible for a given set of conditions.

The present invention consists of the Sensor.class of Objects, which may be instantiated within the CyberSpace environment, to create an instance of a Virtual Sensor Object. As such, the Sensor.class of Objects provides only Instance Variables and Class Methods, for reference and invocation by other CyberSpace Objects. The invocation of a Class Method, must always be performed from within another CyberSpace Object, with the appropriate parameters being specified along with the invocation. This gives great utility to the Virtual Sensor Objects, but requires programming skill as a prerequisite to even consider usage. A consumer-oriented solution must nullify this requirement.

Thus, it is a natural extension, and an integral aspect thereof, of the Virtual Sensor Object to also provide a Graphic User Interface (GUI) which supports a fully parameterized implementation of all possible functional invocations of the Class Methods. Further, such a Graphic User Interface will necessarily and immediately provide a Graphic Device for the expression of graphic, visual renderings, and will serve as a default Expression Device for the Sensor.class of Objects.

The Form and Substance of a Sensor

The construction of a Virtual Sensor Object begins with understanding the Form and Substance of a conventional sensor Probe. Towards this understanding, the Form and Substance of such a Probe is discussed with respect to each of the physical and intellectual realms of conscious experience:

I. Physical Realm Discussion

I.A Formal Perspective

In the physical realm, a Probe is typically any device which may be employed to quantify a physically observable property of an Object.

I.B The Physical Substance of a Probe

The Substance of a physical Probe device, in turn, is typically a material which exhibits some novel physical behavior with respect to a physical process of observational interest. For example, the metal Mercury assumes a liquid form for our "living range" of temperature. Further, it expands and contracts in a very predictable manner, and, therefore, is an excellent candidate for making thermometers when the measurement may be visually reflected as a meaningful rendering. In this case, the visual graphic rendering of the measurement is what we actually see with our conscious vision and stands as direct experience of the novel behavior. With respect to the Internet, we are interested in Probes which measure physically observable processes and provide the measurement in an electronic form, e.g., a datastream via an RS-232, etc., connection. Accessing and processing this datastream defines the function of the Observation Method Object.

Naturally, most Probes of this kind will rely on some novel electronic behavior with respect to physical process of observational interest. There can be very, advanced, and expensive, science involved. From an architectural perspective, we are interested in Probe as common Devices which exactly and faithfully transform the measurable Substance of an Object from the physically observable form, into an electronic digital form. Subsequent activity deals with the measurable Substance in an intellectually conceptual form, and defines the function of the Expression Method Object.

I.C The Physical Form Of A Probe

The Form of a Probe will typically have two formal components. The first component is the "Probe" which directly experiences the measurable Substance of the process being observed. It is the "Probe" which affects the novel electronic behavior. Visually, a "Probe" has the Form of a length of common wire, with a small device at one end, and with a plug at the other. The second component is the "controller" which interprets the affected state, of the first component, and then, records the interpretation in an electronic Form, for subsequent transmission. Thus, the visual Form of a Probe appears as a box with input connections from the "Probe", and a single output connection to a platform.

II. Intellectual Realm Discussion

II.A Formal Perspective

In the intellectual realm, a Probe is manifested as a well-defined data stream of quantified measurements.

II.B The Intellectual Substance Of A Probe

In the intellectual realm, the Substance of a Probe provides an interface function between the realm of that which is physically observable and that which may be intellectually conceptualized in a mathematical form. This allows measurements to be quantified according to, and with respect to, a standard.

II.C The Intellectual Form Of A Sensor

In the intellectual realm, the Form of a Probe is that of a transformation mapping which exactly and faithfully transforms the measurable substance of an Object from a physically observable Form, into an intellectually conceptual Form, i.e., an absolute numeric quantity, with respect to the dimensionality of the physically observable event.

Thus concludes this discussion of the Form and Substance of a Probe with respect to each of the physical and intellectual realms of conscious experience.

Drawings and Formal Symbols

Each of the drawing Figures, therein presented, may consist of a series of GUI Window Objects, which have a visible Form in CyberSpace, along with other Objects which have no visible Form in CyberSpace. Typically, the GUI Window Objects are represented as if they were displayed on a monochrome, black and white cathode ray tube monitor. The other Objects which have no visible Form in CyberSpace are presented as the graphic rendering of a Formal Symbol for the representation of a Class of Objects which may have multiple distinct instances for a Class. Each Object instance, in turn, has a distinct set of Object Instance Variables and Object Class Methods.

If an entirely blank page represents the content of CyberSpace, then an instance of a CyberSpace Object Class is represented by a "double lined" severance which cleaves the CyberSpace into an Internal Space and External Space. The Form and Substance of the Object is then represented and described within the Internal Space of the Object distinction from the rest of CyberSpace. Instance Variable declarations are presented either as a text narrative, or, as an "Object-Oriented" pseudo-language form of syntax. Class Method declarations are represented as distinct, single-line bordered boxes with a title bar on the upper edge which indicates the name of the Method within the Class. Parenthesis follow the Class Method name to emphasis the special status of a Class Method name, and to suggest the nature of any parameters which may be passed to the Class Method during an invocation of the Class Method. Within the titled and bordered boundary of a Class Method box, the substantive logic of the Class Method is represented by a conventional flow chart type of diagram. Information flow between Objects is represented as a single line for one-way flow, and double lines for two-way flow. Finally, "square brackets" are used in a conventional programming language sense to indicate an element of an "array" structure. Likewise, bold face type is used to emphasize the critical programmatic nature of certain class, variable, or parameter names.

The Virtual Sensor Object

With this understanding, we have determined that a Sensor.class Object must define and declare Object instances of the following formal classes:

ObservationMethod.class
ExpressionMethod.class
EvaluationMethod.class
RenderingMethod.class In the sense that a child Object is created and instantiated by a parent Object in FIG. 1, the Sensor.class Object 1-1 enjoys a parent-child relationship 1-2 with the ObservationMethod.class Object 1-3, as well as a parent child relationship 1-4 with the ExpressionMethod.class Object 1-5. Further, the ExpressionMethod.class Object 1-5 enjoys a parent-child relationship 1-6 with the EvaluationMethod-.class Object 1-7, as well as a parent child relationship 1-8 with the RenderingMethod.class Object 1-9. The parent-child relationships have no practical effect on the operation of a Sensor.class Object 1-1, but do establish conditions for the construction of such a Virtual Sensor Object. For example, a GUI for the construction and management of a Virtual Sensor Object 1-1 must assume responsibility for the creation and instantiation of the ObservationMethod.class Object 1-3, the ExpressionMethod.class Object 1-5, and the pairs of EvaluationMethod.class Object 1-7 and RenderingMethod.class Object 1-9 which constitute the Sensor.class Object 1-1. It should be noted that, as distinct CyberSpace Objects, all communication among such Objects is defined by, and both allowed and limited by, the Methods which are supported by the Objects of interest.

These Objects interact with other Objects, as indicated by the Formal Symbols in FIG. 1, to enable a direct flow of digital information 1-11, 1-12, 1-14, 1-15, 1-17, 1-18 from a source sensor device 1-10 to a destination expression device 1-19. The internal Form and Substance of the Object Classes are not represented in FIG. 1, but are detailed in FIG. 2 through FIG. 7.

The complete architecture of a Sensor.class Object 1-1 as depicted in FIG. 1, begins with a source of digital information 1-10 which is available via a URL reference, using an appropriate Protocol Portion, such as "file://" or "http://". The communication between the source of digital information 1-10 and the ObservationMethod.class Object 1-3 is bi-directional 1-11 and allows access to either:

a general file or database structure in a "snapshot" manner via a Static Mode of observation; or, a Sensor Device Driver in a "continuous" manner via a Dynamic Mode of observation.

With the Static Mode of observation, a logically complete set of observation readings are obtained as a single, bulk downloading event, whereas, with the Dynamic Mode of observation, reading values are continuously updated in real-time by a specific sensor probe Device Driver. The updates from said Device Driver may be handled by either sync polling for a reading, or may be asynchronously interrupted when a reading event occurs. In any such case, the reading result values, which are observed by the ObservationMethod.class Object 1-3, are then placed 1-12 into an ObservationReadings.class Object 1-13 for reference by the GetReading( ) Method 3-3, described below, of the Sensor-.class Object 1-11. Thus, the GetReading( ) Method 3-3 of the Sensor.class Object 1-1 may then always yield an appropriate Sensor Reading for any defined moment, including the current moment. Once an invocation of the GetReading( ) Method 3-3 has instantiated the ObservationReadings.class Object 1-13 for the moment of interest, the Express( ) Method 7-3 of the Sensor.class Object 1-1 may be invoked to cause the substantive meaning of the sensor reading to be expressed on the target Expression Device 1-19.

The ExpressionMethod.class Object 1-5 in FIG. 1, enjoys a child Object relationship 1-4 with the Sensor.class Object 1-1 as the parent Object. The ExpressionMethod.class Object 1-5 also enjoys a parent relationships 1-6, 1-8 with the child EvaluationMethod.class Objects 1-7 and RenderingMethod.class Objects 1-9, respectively, which it creates and maintains. Note that parent-child relationships are represented by "arrowed" lines between Class Objects, but also imply the bi-directional potential for information flow. An invocation of the Express( ) Method 7-3, described below, of the Sensor.class Object 1-1 will cause the contents of the current ObservationReadings.class Object 1-13 to be passed to 1-14 the EvaluationMethod.class Object 1-7 for the evaluation of substantive meaning. The EvaluationMethod.class Object 1-7 in FIG. 1, is formulated as a mathematical transformation of a dimensioned measurement with respect to a classification scale that is appropriate to the dimensionality of the units of measurement. The result of said transformation is a statistical quantity which may be interpreted as a meaningful indication of the degree of deviancy from a comfortable, natural, or general accepted state or behavior for an observed reading. Implicit in each EvaluationMethod..class Object 1-7 is the emDeviation( ) Method 8.7, described below, which invokes the emAverage( ) Method 8.7, described below, to define the natural or generally accepted state or behavior for an observed reading. The emDeviation( ) Method then classifies an ObservationReadings.class Object, which is passed as a parameter to the emDeviation( ) Method, with respect to the emAverage( ) Method.

With this mathematical formulation of the EvaluationMethod.class Object 1-7 in FIG. 1, it is natural to define a so-called "Null Evaluation" Method to provide a transformation which recrosses the distinction between a dimensioned and statistical Object and effectively nullifies any transformative effects or actions. In general, such a Null Evaluation Method exists for any defined RenderingMethod.class Object 1-9 Method. The Null Evaluation Method accesses 1-14 and passes 1-15 the Substance of the ObservationReadings.class Object 1-13 directly onto the RenderingMethod.class Object 1-9, without interpretation. This allows arbitrary binary information to be passed directly through from the sensor device to the expression device. For example, the source of digital information could be a digital camera or video recorder, and the expression device is a CRT.

The substantive meaning is represented as a Deviation-Statistic.class Object 1-16 in FIG. 1, which represents the quality of deviation from an accepted standard. The quality of clarity is achieved by noting that when there is no deviation from a normal state of being, everything will appear to be normal, and, that when there is a deviation from the normal state, the appearance will be abnormal. The abnormality may be manifested and expressed in any visual, auditory, kinesthetic, olfactory, etc., sense, as long as the normal state is well-defined. Thus, if something appears abnormal, that means that it is, as a substantive fact, abnormal. Critical levels of abnormality may, in turn, invoke other options within the RenderingMethod.class Object 1-9 Methods of expression. For example, in advanced cases, the options within the RenderingMethod.class Object 1-9 may modify the Instance Variables 2-5, described below, contained within the ObservationMethod.class Object 1-3, and thus affect the general strategy of readings observation.

Ultimately, it is the responsibility of the RenderingMethod.class Object 1-9 Methods in FIG. 1, to interpret 1-17 the possible abnormal qualities indicated by the DeviationStatistic.class Object 1-16 and then to render 1-18 an appropriately abnormal expression on the Expression Device. The nature of the expression should be dimensionally, conceptually, or actually congruent with the process being observed.

It must be noted that each of these Object classes in FIG. 1, is intended to be implemented as an abstract class which must be extended with specific Substance that implements the specific Methods that are appropriate to, the project at hand or of interest. Several such extension classes are implemented and support a wide variety of requirements and situations. The extension class are generically referred to as the "xx_.class"es, where the prefix "xx" is assigned as follows:

| Abstract Class | Substantive Extension |
|---|---|
| ObservationMethod.class | om_.class |
| ExpressionMethod.class | xm_.class |
| EvaluationMethod.class | em_.class |
| RenderingMethod.class | rm_.class |

With this logical architecture of Form for the Sensor.class Objects, we now address the issues of the Substance of the internal mechanics, as Object-oriented programming language specifications, and the Form of the external interface in a tangible medium, as the Form of a canonical Window GUI. The following sections detail the Form and Substance of the Objects which are created as components of, and interact with, the Sensor.class of Objects.

The Internal Substance—ObservationMethod.class Objects

Figure 2:
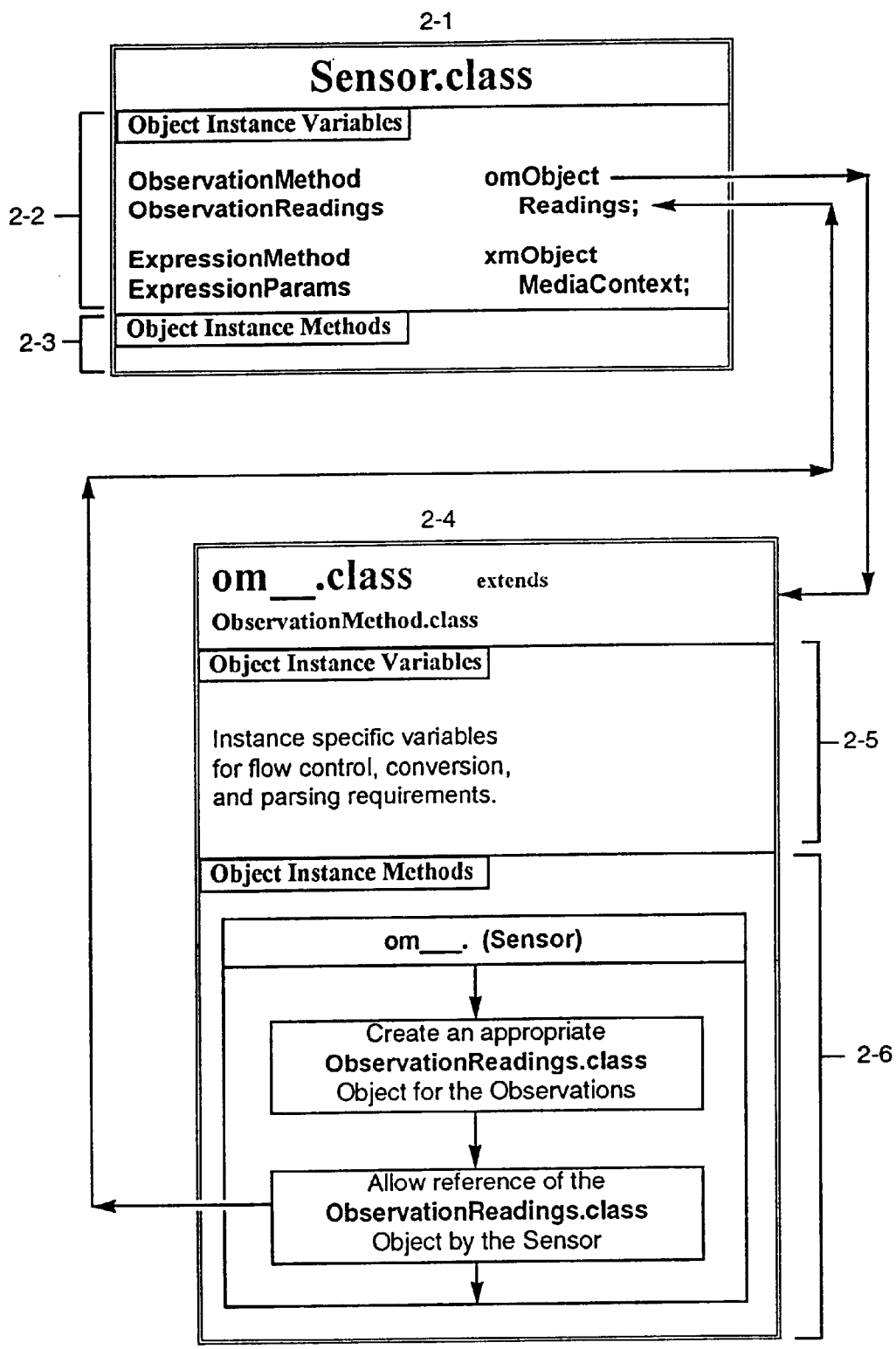
FIG. 2 is a graphic rendering of a Sensor.class Object being instantiated by an om__.class extension of the ObservationMethod.class Objects.

In FIG. 2, we see a Sensor.class Object 2-1, which contains Object Instance Variables 2-2 and Object Instance Methods 2-3, and a typical om_.class extension Object 2-4 for the substantive creation of an ObservationMethod.class Object, which, of course, likewise contains distinct Object Instance Variables 2-5 and Object Instance Methods 2-6.

In the Object Instance Variables 2-2 in FIG. 2, we note that a declaration of a reference name, for an instance of the abstract Object class, ObservationMethod.class, is declared along with a reference name for an Object instance of the ObservationReadings.class. The actual Object instances will be created as an om_.class Object 2-4 and as an or_.class Object 3-9 or 3-12, respectively. As specific instances relate to specific problems being addressed, the om_.class is in a unique position and situation to know and implement exactly the standard variable and algorithms required to observe variable digital information as if it emanated from a sensor device.

Several such om_.class Objects have been implemented for ASCII file access and support various timestamp, numeric, graphic, Decimal Value, and other MIME formats, with a standard algorithm for merging and reconciling the various TimeLines with respect to other Virtual Sensors at a client Site. Specific DataBase access om_.class Objects must be specifically programmed on a case by case basis. Standard Software interfaces may be supplied by sensor manufactures to serve as the Substance of such Objects.

As such, the om_.class Object 2-4 in FIG. 2, allocates and specifies the format and content of the digital information, whether it represents textual, numeric, graphic, caloric, auditory, etc. information. Thus, the or__.class, Object 3-9 or 3-12 of the Sensor.class Object 2411 is in fact created by the om class Object 2-4 during the construction. In other words, when a Sensor.class Object 2-1 is being constructed, it is only necessary to create an om__.class Object 2-4, as depicted by the line from the omObject declaration 2-2 to the Object instance thereof 2-4, whereas an appropriate or__.class Object will be automatically created, based on the requirements of the om__.class Object, as depicted by the line from the om__( ) Constructor Method 2-6 to the Readings declaration 2-2.

The Internal Substance—ObservationReadings.class Objects

Figure 3:
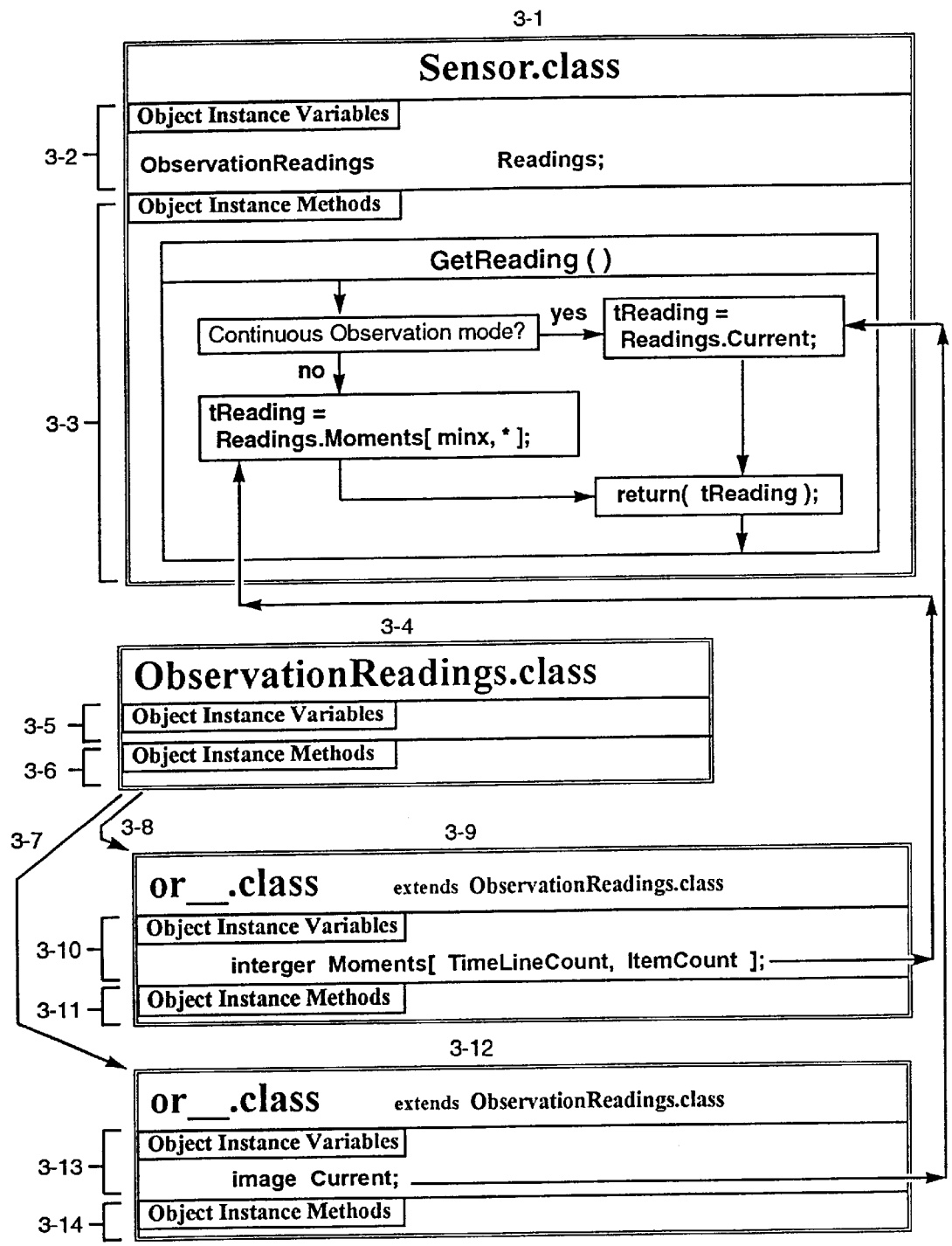
FIG. 3 is a graphic rendering of the GetReading Method of a Sensor.class Object and example or__.class extensions of the ObservationReadings.class.Object.

In FIG. 3, two examples of specific or__.class extension Objects are depicted 3-9, 3-12, along with their relationship to the GetReading( ) Method 3-3 of a Sensor.class Object 3-1. Each of the Sensor.class Object 3-1, the ObservationReadings.class Object 3-4, the first example or__.class Object 3-9, and the second or__.class Object 3-12, have their own, distinct Object Instance Variables 3-2, 3-5, 3-10, 3-13 and Object Instance Methods 3-3, 3-6, 3-11, 3-14, respectively. The relationship of substantive extension between the ObservationReadings.class Object 3-4 and the example or__.class extension Objects is represented by the pairs of connecting lines indicated as 3-7 and 3-8. In general only the storage type and number of elements will vary from one specific or__.class 3-9, 3-12 to another: the reference names and indexing requirements will be independent of the storage type and number of elements considerations.

Further, the ObservationMethod.class Object 3-4 in FIG. 3 must support the acquisition of digital information in either a Static Mode, whereby all digital information is received from an archive or DataBase system in an orderly manner, or in an Dynamic Mode, whereby an observation is periodically obtained in real-time by an independent Sensor device. The GetReading( ) Method 3-3 presents the;,two possibilities for having a specific observation reading returned by the Method.

In FIG. 3, for digital information which is to interpreted as numeric, the or__.class Object 3-9 is merely an abstract formalization of a dynamically a allocated array of integers into a Class which stores information in an arbitrary structure, such as a minimally allocated array of integers. This is suggested by the declaration of an array of integers which is referenced by the name Moments 3-10. The Moments 3-10 array is two dimensional to allow indexing by a moment index and a reading value index, for cases in which a sensor probe may return multiple values for a single reading moment. The reading value index will also serve as a parameter which is referenced from within the ExpressionMethod.class Object 6-4, in order to specify the origin of the reading value which is being evaluated. By formal analogy, the or__.class Object 3-12 for a series of graphic images, which are continuously refreshed by a Device Driver, require only a single instance declaration of an image.class Object 3-13. Additional declarations may be made, as needed, to implement standard techniques such as "double buffering" to eliminate any "flicker effects" that may occur during animation on certain platforms and expression devices.

In the first example or__.class Object 3-9 in FIG. 3, the digital information of the observed readings is represented by an array of ItemCount integer values 3-10. Further, the first example 3-9, deals with the Static Mode of observation and further declares the storage to contain a TimeLineCount number of such arrays of readings 3-10. Accordingly these storage elements may be referenced by the variable name of Moments 3-10. Note well that the ItemCount and TimeLineCount variables may be dynamically assigned their values by the om__( ) Constructor Method 2-6.

In the second example or__.class Object 3-12 in FIG. 3, the digital information of the observed readings is represented by a bitmap graphic image 3-13. Further, the second example 3-12, deals with the Dynamic Mode of observation and requires only the current reading to be available at any time. Accordingly this storage element may be referenced by the variable name of Current 3-13.

The Internal Substance—Static Mode ObservationMethod.class Objects

Figure 4:
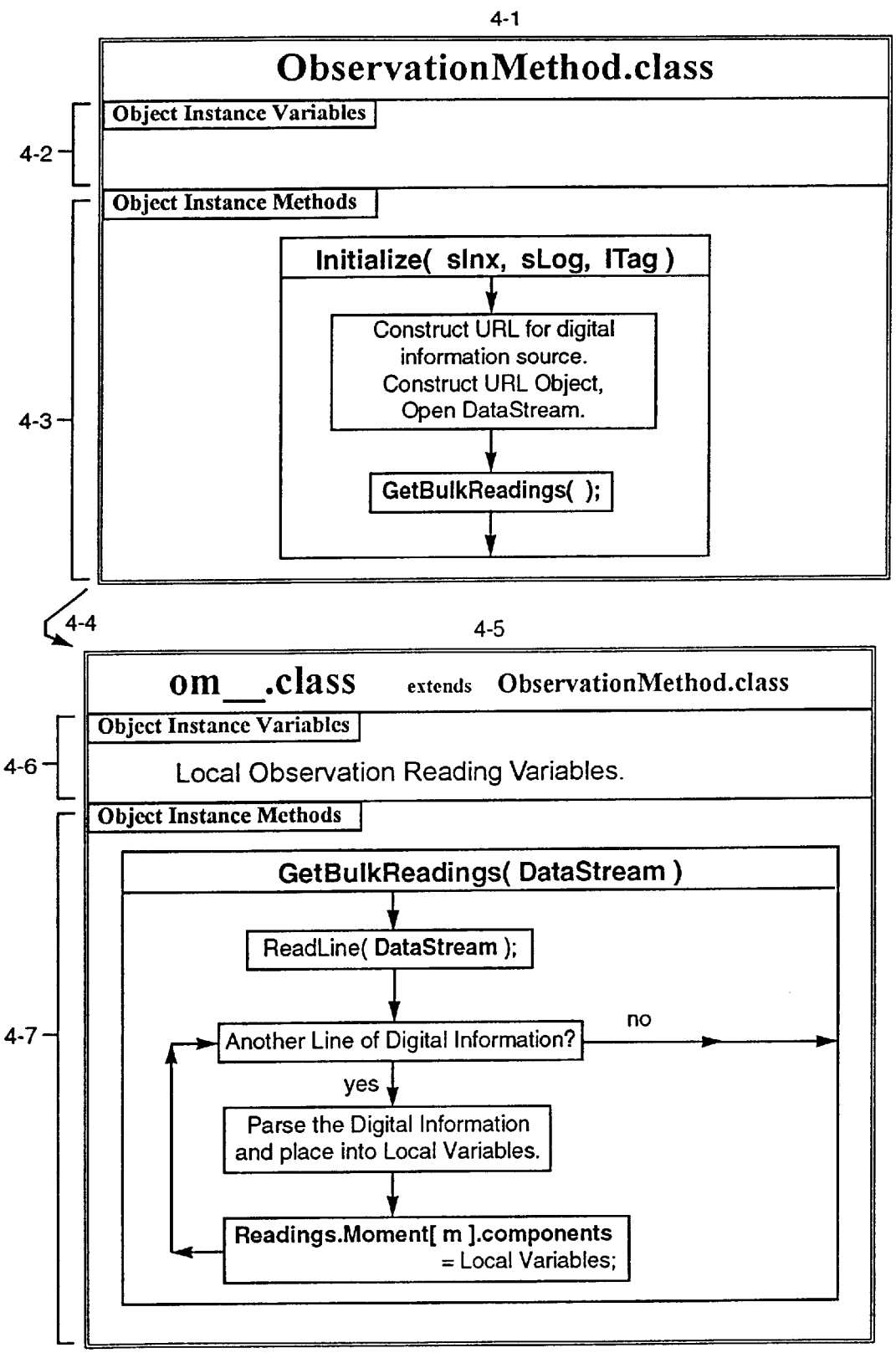
FIG. 4 is a graphic rendering of a Static Mode om__.class extension of the ObservationMethod.class.

FIG. 4 provides the example of an ObservationMethod.class Object 4-1 which is extended by the Substance of a Static Mode om__.class extension Object 4-5. Each of the ObservationMethod.class Object 1 and the om__.class Object 4-5 have their own, distinct Object Instance Variables 4-2, 4-6 and Object Instance Methods 4-3, 4-7 respectively. The relationship of substantive extension between the ObservationMethod.class Object 4-1 and the example om__.class extension Object 4-5 is represented by a connecting line 4-4.

In FIG. 4, the parameter list of the Initialize( ) Method 4-3 specifies a unique Virtual Sensor identification index, sInx, an abstract ListBox Object, sLog, and an abstract Label Object, lTag. The formal abstract Window Objects may be instantiated by any standard Abstract Windows Toolkit (AWT) platform implementation, and thus, allow display of the activity of the Initialize( ) Method 4-3 on said platform via actual abstract Window Objects. Note that for a Static Mode om__.class extension Object 4-5, a conformal or__.class Object 3-9 acts as a table structure of all readings for the period of moments which are downloaded in bulk, or may be possibly staged for refresh.

For a Static Mode ObservationMethod.class Object, the Initialize( ) Method 4-3 in FIG. 4, of the Virtual Sensor performs certain housekeeping chores concerned with accessing the digital information which is available via the specification of a Universal Resource Locator (URL) and appended parameter information. There are two general "bulk access" programming approaches for obtaining the digital, information associated with an observation: ASCII file access and generic Data Base access. The resource indicated by a URL may represent either content or intent, in conformity with the Form of said Boolean Arithmetic. In the case of content, the ASCII information is provided directly as a data stream to be parsed and interpreted. In the case of intent, the URL indicates a resource to be executed with the intent that the execution will produce a data stream to be parsed and interpreted. The execution of the intent may involve any data base capabilities which are inherent in the host system of the URL. In the case of data base access, it will be useful to specify an observation period and qualifier to specify the period of readings of interest, see FIG. 13. Generally, the observation period and qualifier will be used to construct the URL and data selection specifications with respect to the client Site. Once communication with the URL has been established, the Initialize( ) Method 413 will invoke the execution of the GetBulkReadings( ) Method of the om__.class extension Object, and then terminate.

In FIG. 4, the GetBulkReadings( ) Method 4-7 performs read-store logic on a per record basis to implement a "bulk-download" Method to observe a complete period set of readings as a single, complete event. The "bulk download" process loops repeated to read, and store, the observed digital information into the ObservationReadings.class Object 3-9, until all the digital information has been read and stored. The URL communication is then terminated.

While the present invention utilizes certain specific access methods, it should be noted that any standard access method for accessing data from a data base or file may be utilized for retrieving the data to perform the data observation. However, the specific access methods which are utilized in the present invention are organized with respect to particular timestamp, numeric, graphic, and other Multi-purpose Internet Mail Extension (MIME) format characteristics which facilitate the retrieval and transmission of this data for receipt by the ObservationMethod.class Object.

Figure 13:
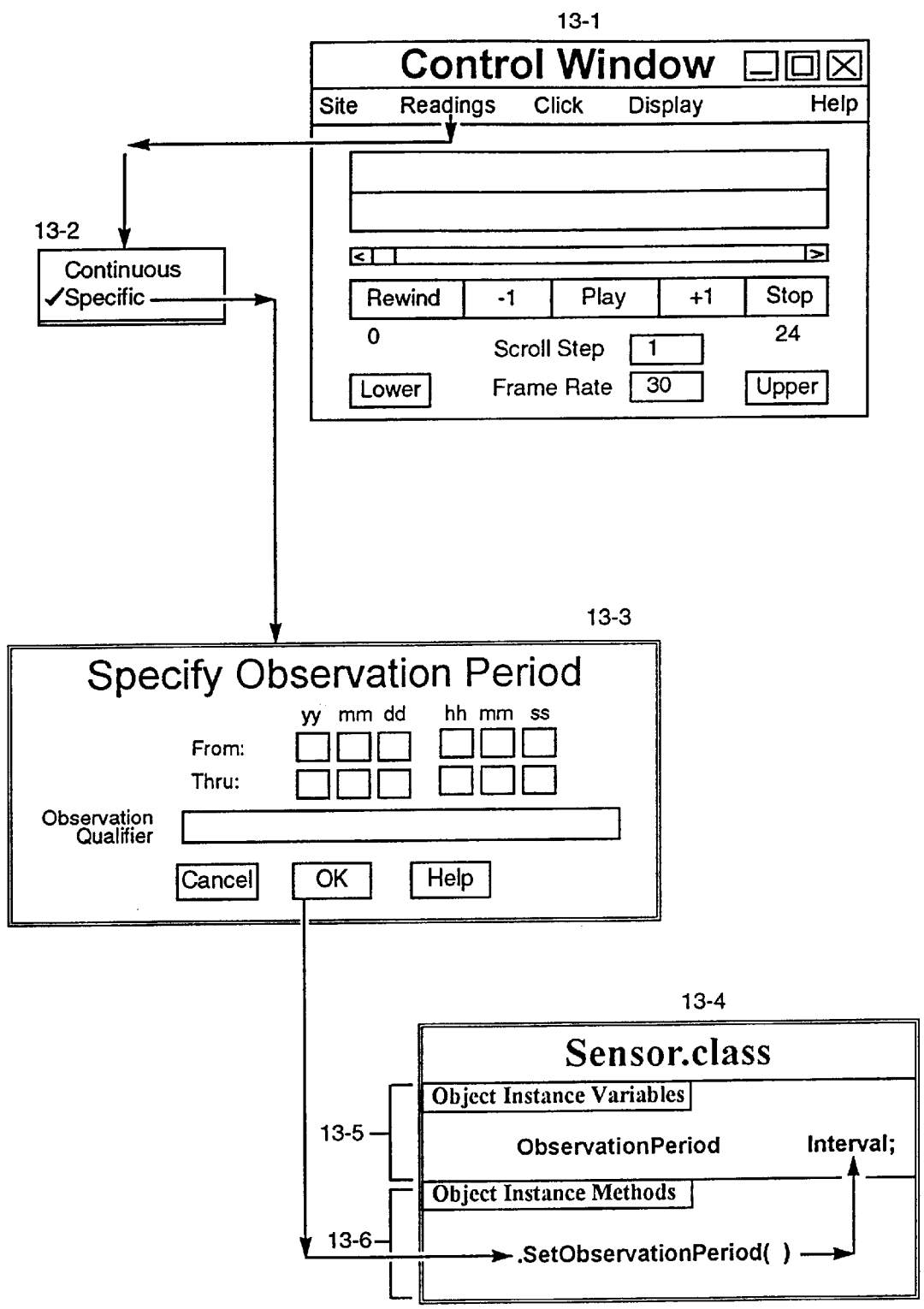
FIG. 13 is a graphic rendering of selecting the Specific Menu Item of the Readings Menu to define an Observation-Period.class Object.

Note that the Initialize( ) Method 4-3 may be invoked either once the User has specified an observation period and qualifier, either via the Site Control Window Menubar, see FIG. 13, or may be invoked via an "AutoLoad" run-time parameter (HTML <Applet> Tag, etc), when a SensiView.class Site Control Window is created.

The Internal Substance—Dynamic Mode ObservationMethod.class Objects

Figure 5:
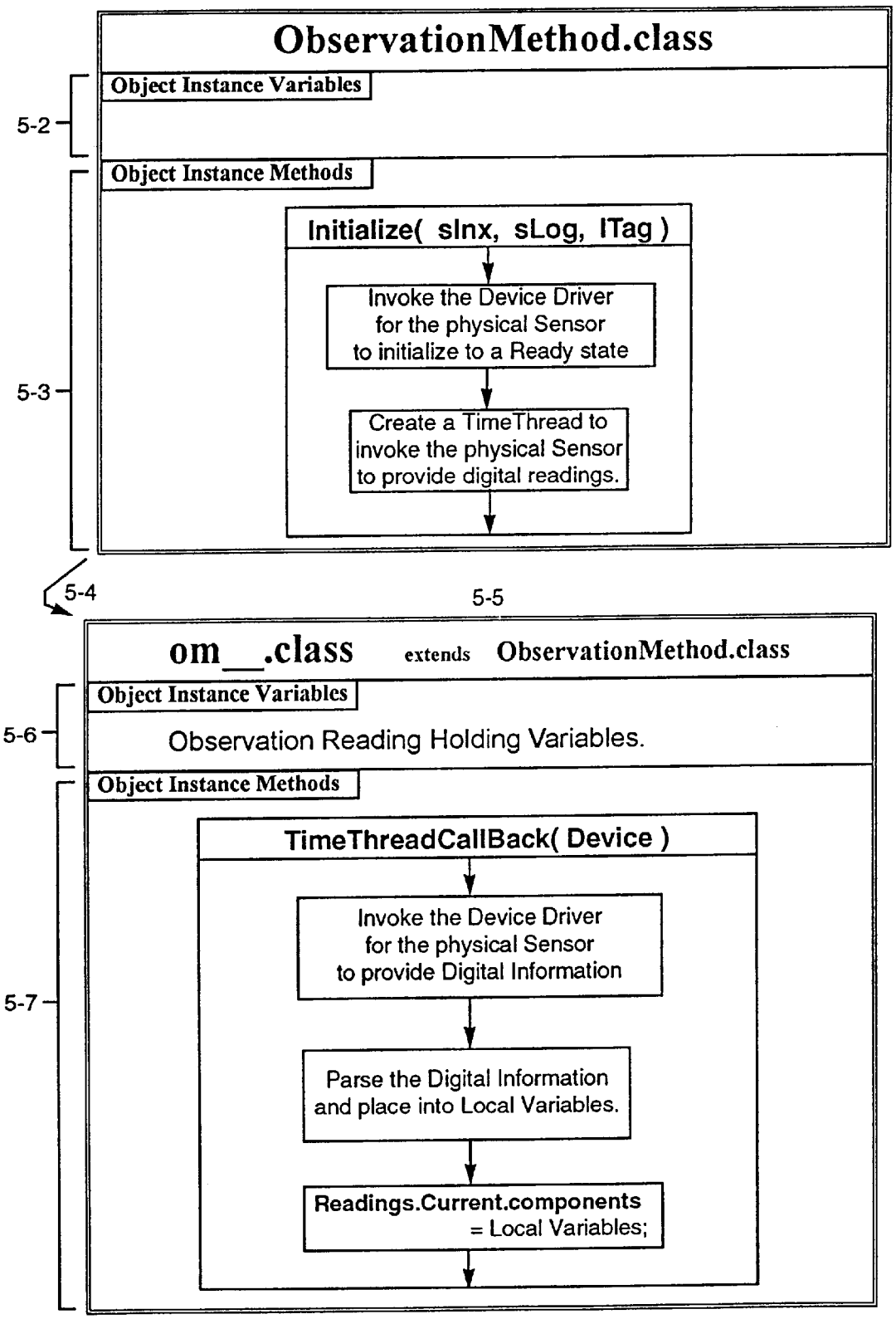
FIG. 5 is a graphic rendering of a Dynamic Mode om__.class extension of the ObservationMethod.class.

FIG. 5 provides the example of an ObservationMethod.class Object 5-1 which is extended by the Substance of a Dynamic Mode om__.class extension Object 5-5. Each of the ObservationMethod.class Object 5-1 and the om__.class Object 5-5 have their own, distinct Object Instance Variables 5-2, 5-6 and Object Instance Methods 5-3, 5-7 respectively. The relationship of substantive extension between the ObservationMethod.class Object 5-1 and the example om__.class extension Object 5-5 is represented by a connecting line 5-4.

In FIG. 5, the parameter list of the Initialize( ) Method 5-3 specifies a unique Virtual Sensor identification index, sinx, an abstract ListBox Object, sLog, and an abstract Label Object, lTag. The formal abstract Window Objects may be instantiated by any standard Abstract Windows Toolkit (AWT) platform implementation, and thus, allow display of the activity of the Initialize( ) Method 5-3 on said platform via actual abstract Window Objects. Note that for a Static Mode om__.class extension Object 5-5, a conformal or__.class Object 5-3, 5-12 acts as a holding area for the Current ("now" ) reading moment.

A real-time access om__.class Object 5-5 must be specifically programmed on a case by case basis and address either an "immediate return" Synchronous Sensor Device Driver or an "interrupt generating" Asynchronous Sensor Device Driver. Software interfaces may be supplied by sensor manufacturers to serve as the foundations for such om__.class extension Objects 5-5. Whereas a Sensor Device Driver may operate in a Synchronous or an Asynchronous manner, the om__.class extensionObject 5-5 will be implemented tot either poll, in a synchronous manner, a "ready" flag which indicates the presence of a new reading, or respond to, in an asynchronous manner, an interrupt event when it is detected on the I/O port which is utilized by the Device Driver.

For a Dynamic Mode ObservationMethod.class Object, the Initialize( ) Method 5-3 in FIG. 5, of the Virtual Sensor performs certain housekeeping chores with respect to the client Site and activating the Sensor Device Driver. The Initialize( ) Method 5-3 will perform standard tasks that are required to establish communication with the physical observation Device Driver.software, as provided by the manufactures of the physical observation sensor probes and devices. Once the Sensor Device Driver is ready to respond to requests for readings, the Initialize( ) Method 5-3 will create a omTimeThread.class Object, and then terminate. In turn, the TimeThread.class Object will periodically invoke the TimeThreadCallback( ) Method 5-7 of the om__.class extension Object. For an Asynchronous Dynamic Mode ObservationMethod.class Object, the creation of such a omTimeThread.class object is unnecessary since the TimeThreadCallback( ) Method 5-7 will be invoked asynchronously via the HandleEvent( ) Method of the ObservationMethod.class Object 5-1, when an asynchronous event generated by the Device Driver is received. The asynchronous sensor Device Driver reading event must be immediately handled via the HandleEvent( ) Method of the ObservationMethod.class Object, in order to dignify the Current nature of the reading and to refresh the reading of the current moment, "now".

In either case, the Dynamic Mode operation will occasionally invoke the execution of the TimeThreadCallback( ) Method 5-7 of the om__.class extension Object. The TimeThreadCallback( ) Method 5-7, in turn, will perform any necessary Device Driver housekeeping chores, then parse and store the digital information of the reading.

Note that the Initialize( ) Method 5-3 may be invoked either via the Site Control Window Menubar, see FIG. 13, or may be invoked via an "AutoLoad" run-time parameter (HTML <Applet> Tag, etc), when a SensiView.class Site Control Window is created.

The Internal Substance—ExpressionMethod.class Objects

The design intently of the ExpressionMethod.class Object is to allow multiple sensory expressions to combine as a single expression of normalcy, or deviation therefrom. Towards this end, we have determined that an ExpressionMethod.class Object must support a list of pairs of:

EvaluationMethod.class

RenderingMethod.class

Objects, where each such pair of evaluation-rendering methods results in an expression for rendition on the target expression device.

Figure 6:
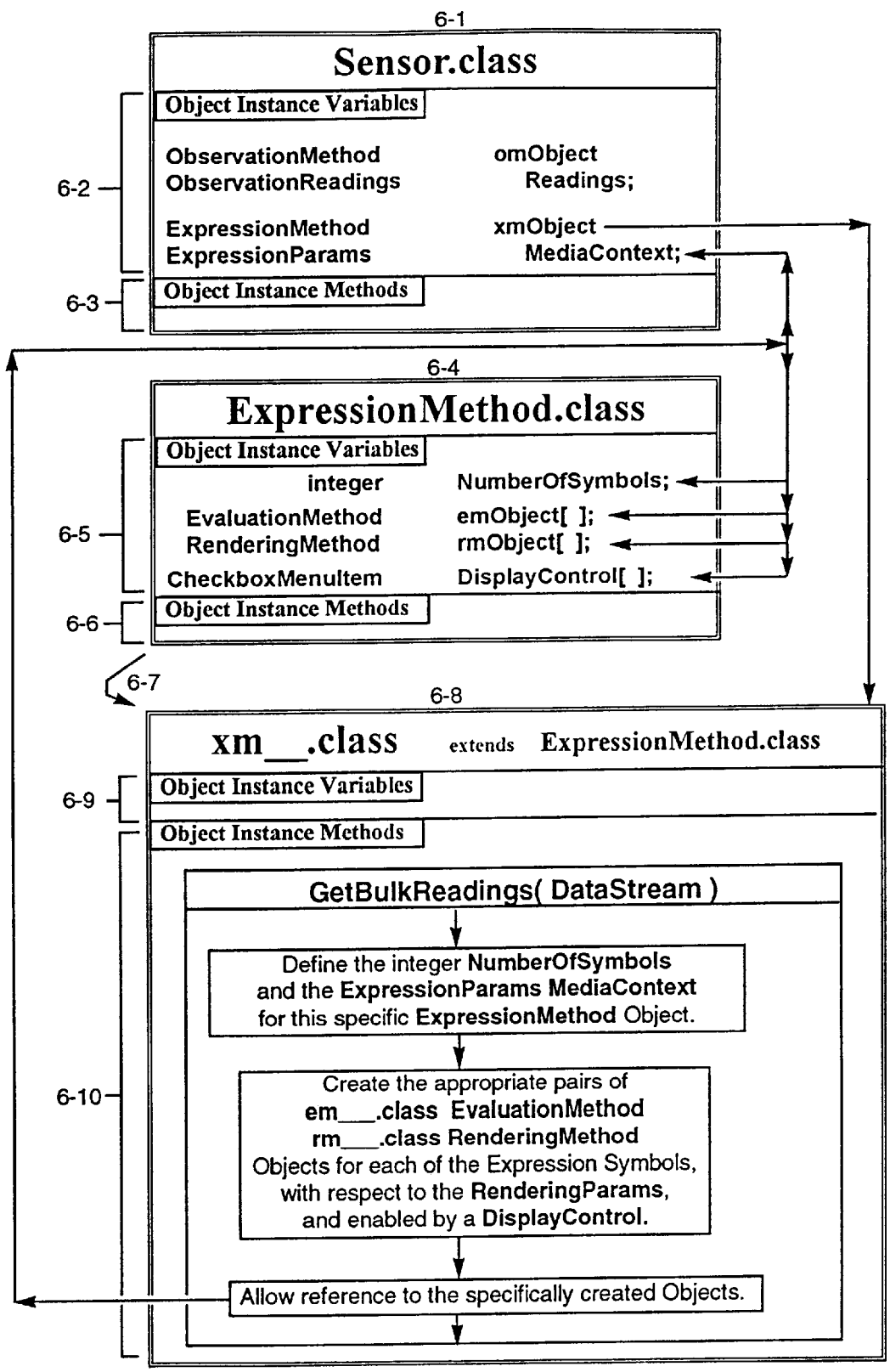
FIG. 6 is a graphic rendering of a Sensor.class Object being instantiated by an xm__.class extension of the ExpressionMethod.class.

FIG. 6 provides the example of a Sensor.class Object 6-1 and the associated ExpressionMethod.class Object 6-4 which is extended by the Substance of a xm__.class extension Object 6-8. Each of the Sensor.class Object 61, the ExpressionMethod.class Object 6-4 and the xm__.class Object 6-8 have their own, distinct Object Instance Variables 6-2, 6-5, 6-9 and Object Instance Methods; 6-3, 6-6, 6-10, respectively. The relationship of substantive extension between the ExpressionMethod.class Object 6-4 and the example xm__.class extension Object 6-8 is represented by a connecting line 6-7. The Figure depicts the creation of the component EvaluationMethod.class Objects, RenderingMethod.class Objects, and other Objects which constitute the ExpressionMethod.class Object. The ExpressionMethod.class Object 6-4 is one of the abstract component Object Classes of the Virtual Sensor, and is always instantiated by an "xm__.class" Object.

In FIG. 6, the declaration of a reference name 6-2, xmObject, is made and instantiated for an ExpressionMethod.class Object 6-4 by the creation of an "xm__.class" Object 6-8. The creation of the xm__.class Object 6-8, is achieved by invocation of the xm__( ) Constructor Method 6-10 of the xm__.class Object 6-8. As such, the xm__.class Object 6-8, is in a unique position and situation to specifically define and configure the components and parameters of the expression to be rendered. Specifically, the xm__( ) Constructor Method 6-will specify the number of symbols 6-5 which comprise the complete expressions, and will also create the arrays for the EvaluationMethod.class Object and RenderingMethod.class Object pairs which generate each such expression symbol 6-5. In addition, the xm__( ) Constructor Method 6-10 will also create a formal abstract CheckboxMenuItem Object, which may be instantiated by any standard Abstract Windows Toolkit (AWT) platform implementation, to allow GUI control of the Virtual Sensor expression. Finally, an ExpressionParams.class Object, MediaContext 6-2, is created and assigned any particular Expression Device parameters which may be necessary for the effective utilization of the 1 Expression Device by the RenderingMethod.class Objects 6-5 involved.

Figure 7:
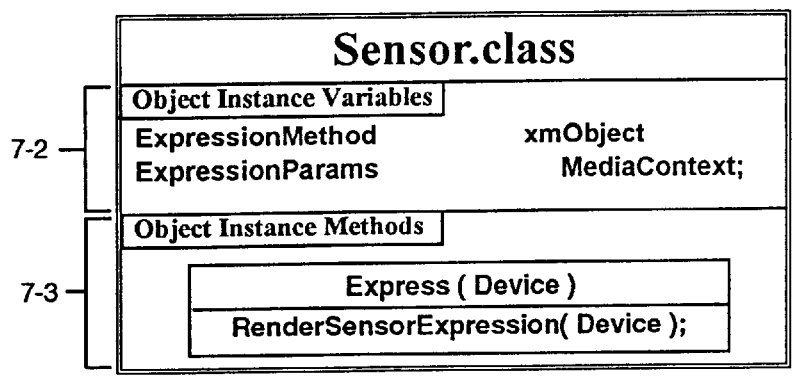
FIG. 7 is a graphic rendering of the relationship between the Express Method of the Sensor.class Object and the RenderSensorExpression Method of the ExpressionMethod-.class.
Figure 7:
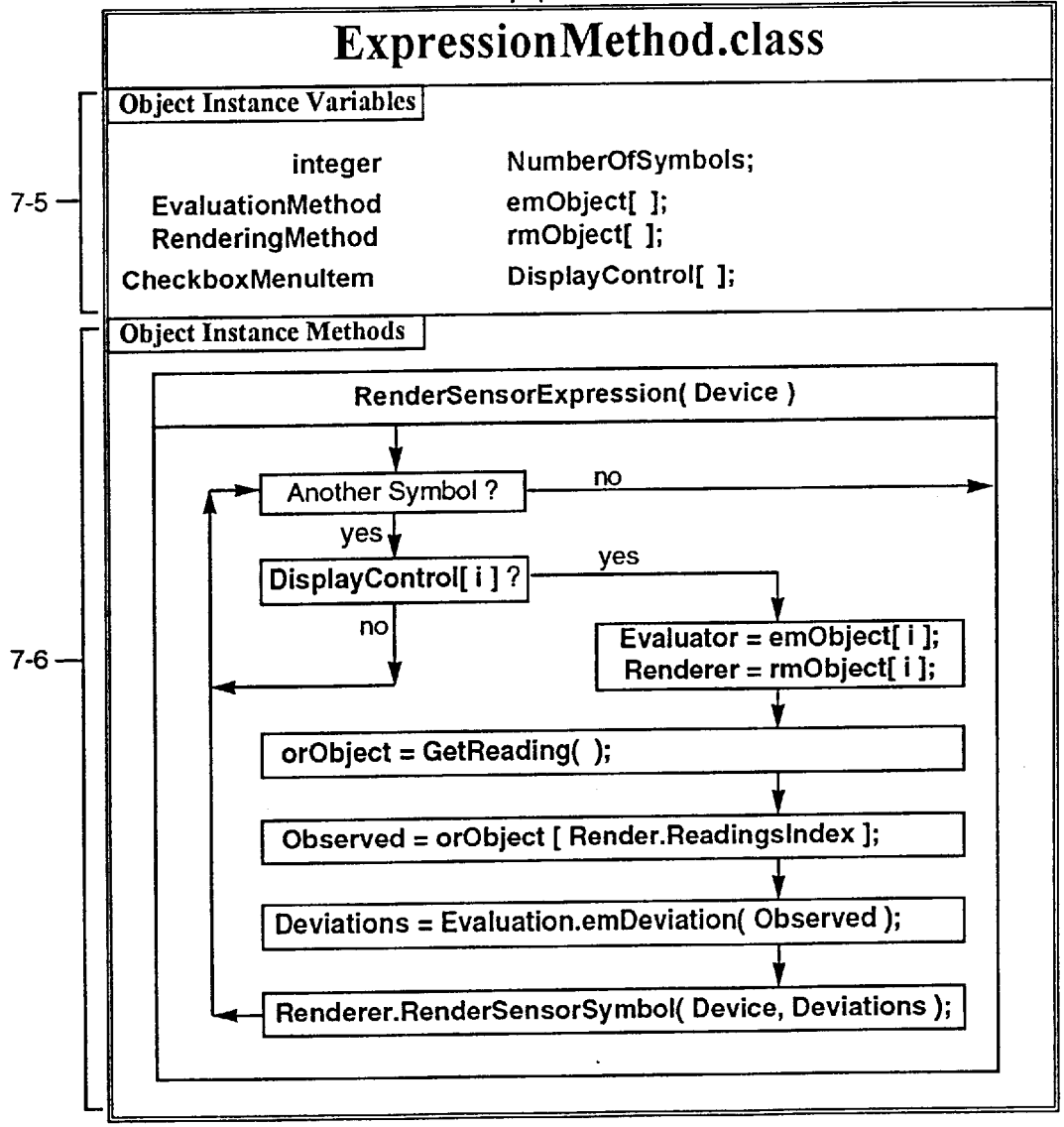

FIG. 7 provides the example of a Sensor.class Object 7-1 and the associated ExpressionMethod.class Object 7-4. Each of the Sensor.class Object 7-1 and the ExpressionMethod.class Object 7-4 have their own, distinct Object Instance Variables 7-2, 7-5 and Object Instance Methods 7-3, 7-6, respectively. The Figure depicts a conventional logic flowchart and Object-oriented programming code of the RenderSensorExpression( ) Method 7-6, and its relationship to the Express( ) Method 7-3 of the Sensor.class Object 7-1. The intent of the RenderSensorExpression( ) Method 7-6 is to express the normality, or lack thereof, of the readings obtained from the GetReading( ) Method 3-3 of the parent Sensor.class Object 7-1.

It should be noted that for each RenderingMethod.class Object, it is always possible to construct a so-called "Identity" ExpressionMethod.class Object for the RenderingMethod.class Object, by pairing the RenderingMethod.class Object with the "Null" EvaluationMethod.class Object, so as to form a single pair rendering expression. For all such "Identity" ExpressionMethod.class Objects, the rendering will be directly, immediately, and exactly determined by the observation readings.

In FIG. 7, it is assumed that whatever GUI, or other CyberSpace Object, which invokes the execution of the Express( ) Method 7-3 of a Sensor.class Object, will also provide a Device Object 7-3, as a parameter to the Method, which may serve as the target Expression Device on which to render the Expression of the Virtual Sensor Object 7-1. In turn, the Express( ) Method 7-3 invokes the execution of the RenderSensorExpression( ) Method 7-6, likewise passing the Device Object 7-3, as a parameter.

The execution of the RenderSensorExpression( ) Method 7-6 in FIG. 7 begins by counting against the number of symbol renderings which comprise the complete expression and exiting when all the symbols have been rendered. When a symbol remains to be expressed, a check is made against the DisplayControl CheckboxMenuItem Object and determines if the symbol should be rendered or ignored. If it is to be ignored, then the counting is advanced to the next possible symbol and the looping continued until exit, is achieved. Otherwise, the EvaluationMethod.class Object and the RenderingMethod.class Object for the current symbol count are obtained as the Evaluator and Renderer Objects, respectively. Other such temporary storage variables, ObservationReadings orObject; Reading Observed; and DeviationStatistic Deviations; are likewise declared for processing convenience and clarity. Then the GetReading( ) Method 3-3 of the Sensor.class Object 7-1 is invoked to obtain then currently specified moment of digital information reading and the ReadingsIndex element 7-6 of the ObservationReadings Object is taken as the observed digital information which contains a substantive meaning to be expressed. The specific Reading is then passed to emDeviation( ) Method of the Evaluator Object to obtain the Deviations associated with the Reading. Finally, the Deviations are passed as parameters, along with the target Expression Device, to the RenderSensorExpression( ) Method which then expresses an appropriate symbol on the Expression Device. Then the counting is advanced to the next possible symbol and the looping continued until exit is achieved.

The Internal Substance—EvaluationMethod.class Objects

Figure 8:
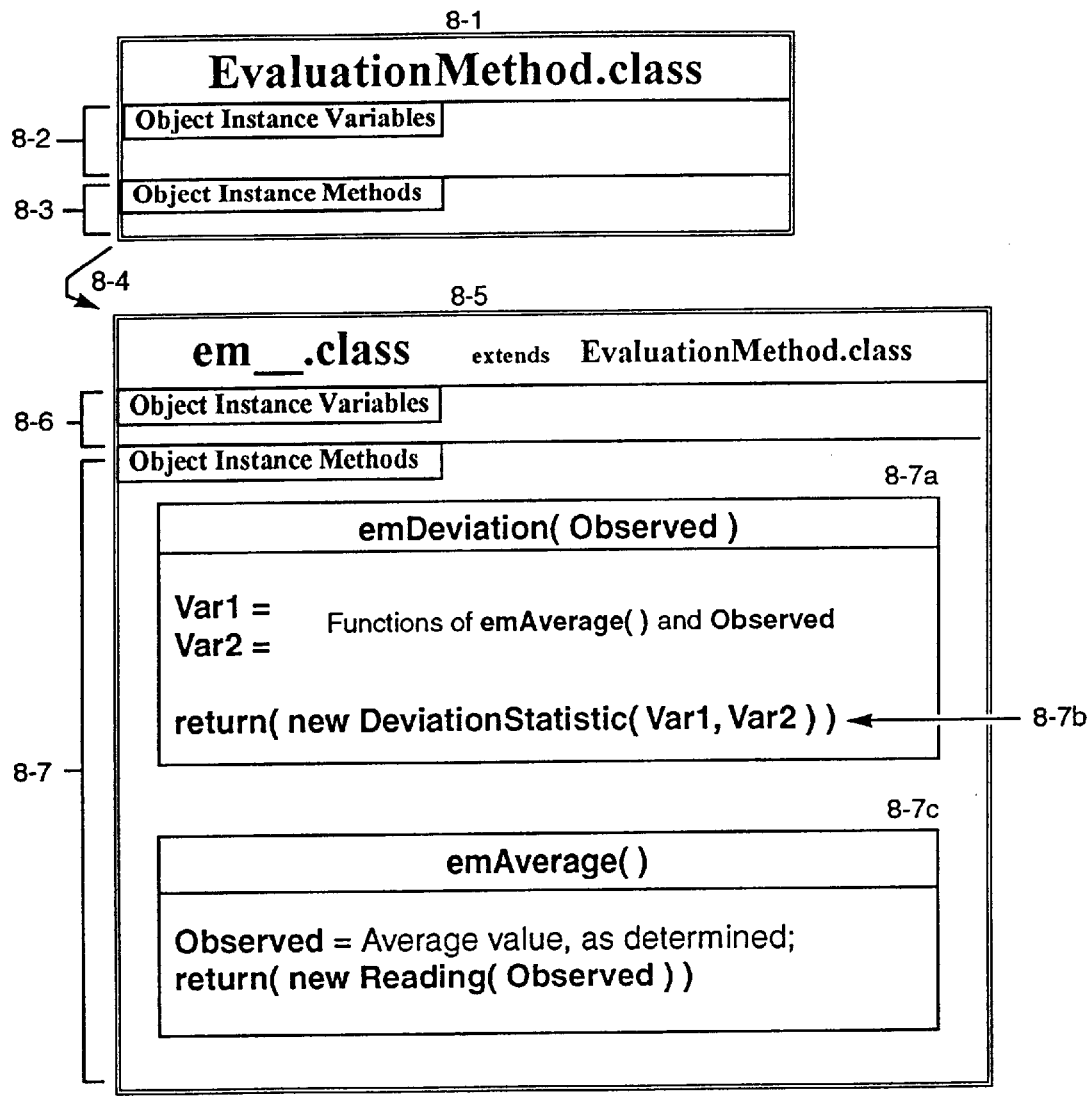
FIG. 8 is a graphic rendering of the emDeviation and emAverage Methods of the EvaluationMethod.class.

FIG. 8 provides the example of an EvaluationMethod.class Object 8-1 which is extended by the Substance of a em__.class extension Object 8-5. Each of the EvaluationMethod.class Object 8-1 and the em__.class Object 8-5 have their own, distinct Object Instance Variables 8-2, 8-6 and Object Instance Methods 8-3, 8-7 respectively. The relationship of substantive extension between the EvaluationMethod.class Object 8-4 and the em__.class extension Object 8-5 is represented by a connecting line 8-4.

It is the function of the EvaluationMethod.class Object 8-1 to support an emDeviation( ) Method 8-7a which will evaluate an Observed Reading, as a parameter, against a range of normal values and the degrees of deviation from the normal range. The deviation information is typically returned from the Method via a DeviationStatistic.class Object 8-7b. Likewise, an emAverage( ) Method 8-7c will yield the average, expected value for said range of normal values. There are two specific em__.class extension Classes 8-5 of interest:

emIdentity.class the "Null" EvaluationMethod.class, and emRangeDialog.class the "Dynamic Range" EvaluationMethod.class.

The emIdentity.class provides no transformative activity on the Observed Reading parameter 8-7a which is passed to the emDeviation( ) Method 8-7a of the said Class, whereas the DeviationStatistic 8-7b will be constructed to return exactly the Observed Reading parameter 8-7a which was passed in for evaluation. This is a recrossing of the distinction between a dimensional and a statistical entity and conforms to the Form of the said Boolean Arithmetic.

The emRangeDialog.class provides a dynamically configurable range of deviation values via a "Deviation Range Specification Dialog" Object that supports a dynamically configurable range of deviation values against a quantified dimensional scale.

The Internal Substance—RenderingMethod.class Objects

Figure 9:
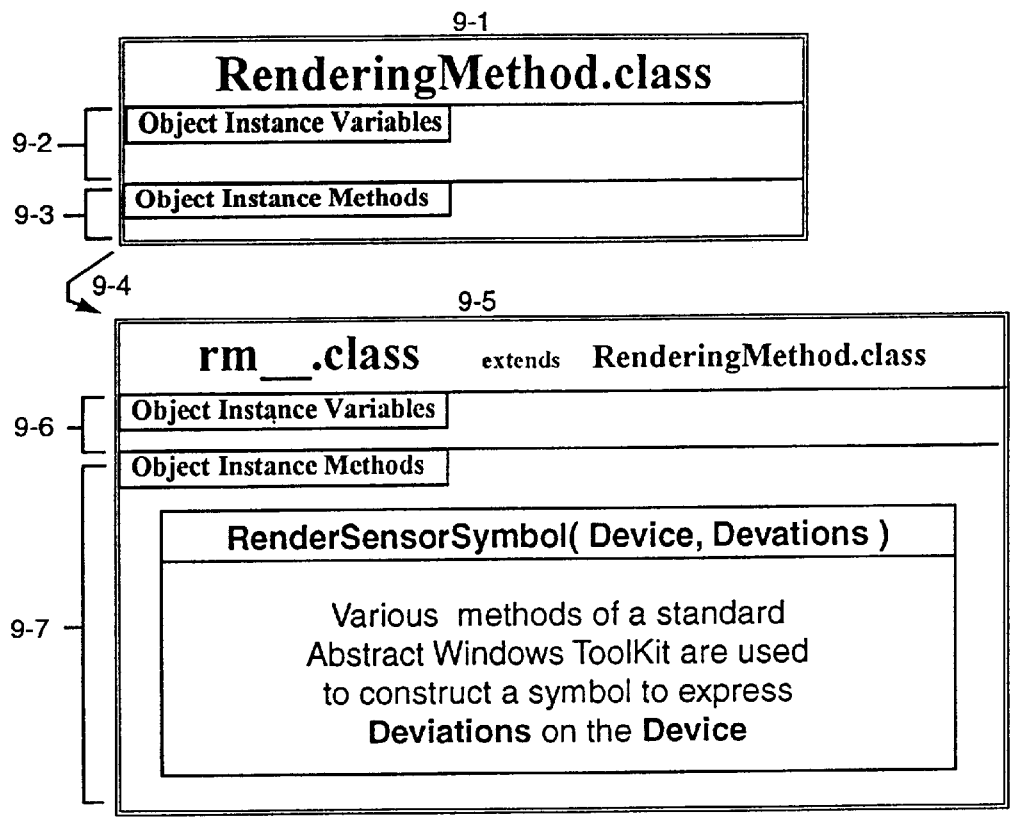
FIG. 9 is a graphic rendering of the RenderSensorSymbol Method of the RenderingMethod.class.

FIG. 9 provides the example of a RenderingMethod.class Object 9-1 which is extended by the Substance of a rm__.class extension Object 9-5. Each of the RenderingMethod.class Object 9-1 and the rm__.class Object 9-5 have their own, distinct Object Instance Variables 9-2, 9-6 and Object Instance Methods 9-3, 9-7 respectively The relationship of substantive extension between the RenderingMethod.class Object 9-4 and the rm__.class extension Object 9-5 is represented by a connecting line 9-4.

It is the function of the RenderingMethod.class Object 9-1 to support a RenderSensorSymbol( ) Method 9-7 which will render an appropriate symbol on an Expression Device, Device, for a DeviationStatistic.class Object. A Graphics Device is always available in the context of a GUI and this leads to a discussion of the features available in any standard Abstract Windows ToolKit (AWT) for the construction of geometric shapes and graphic images. We have determined several natural symbols for expressing abnormalities and deviations, which have been implemented as rm_.class extension Objects 9-5. The typical rm_.Class extension may also support a RenderingParms.class Object for each invocation of the effective Method, which are controlled at the parent ExpressionMethod.class Object 6-4.

The Internal Substance—Conclusion

This completes the construction of the Virtual Sensor Object as an instance of the Sensor.class. Aside from the Log ListBox and Status Label pair of Abstract Window Toolkit Control Objects, passed as parameters to the Observation-Method.class Methods, there are no Graphic User Interface elements used within the Virtual Sensor Object. Thus, we begin the construction of a fully parameterized Graphic User Interface to provide an End-User friendly form of interaction with the features and benefits of a Virtual Sensor. At each stage of the following constructional, standard conventions and practices concerning the Forms of rendering and design of GUI layouts and elements will be observed as canons for the construction for the GUI, and thus it will exist as a canonical GUI Window.

The External Form—A Site of Virtual Sensors

It is a natural extension of the Virtual Sensor Object to also provide a Graphic User Interface (GUI) which supports a fully parameterized implementation of all possible functional invocations of the Class Methods. Further, such a Graphic User Interface will necessarily and immediately provide a Graphic Device for the expression of visual renderings, and will serve as a default Expression Device for the Sensor.class of Objects. If we consider a set of Virtual Sensor Objects with respect to some reference system, or client Site, within CyberSpace, two distinct levels of management must be addressed.

Figure 19:
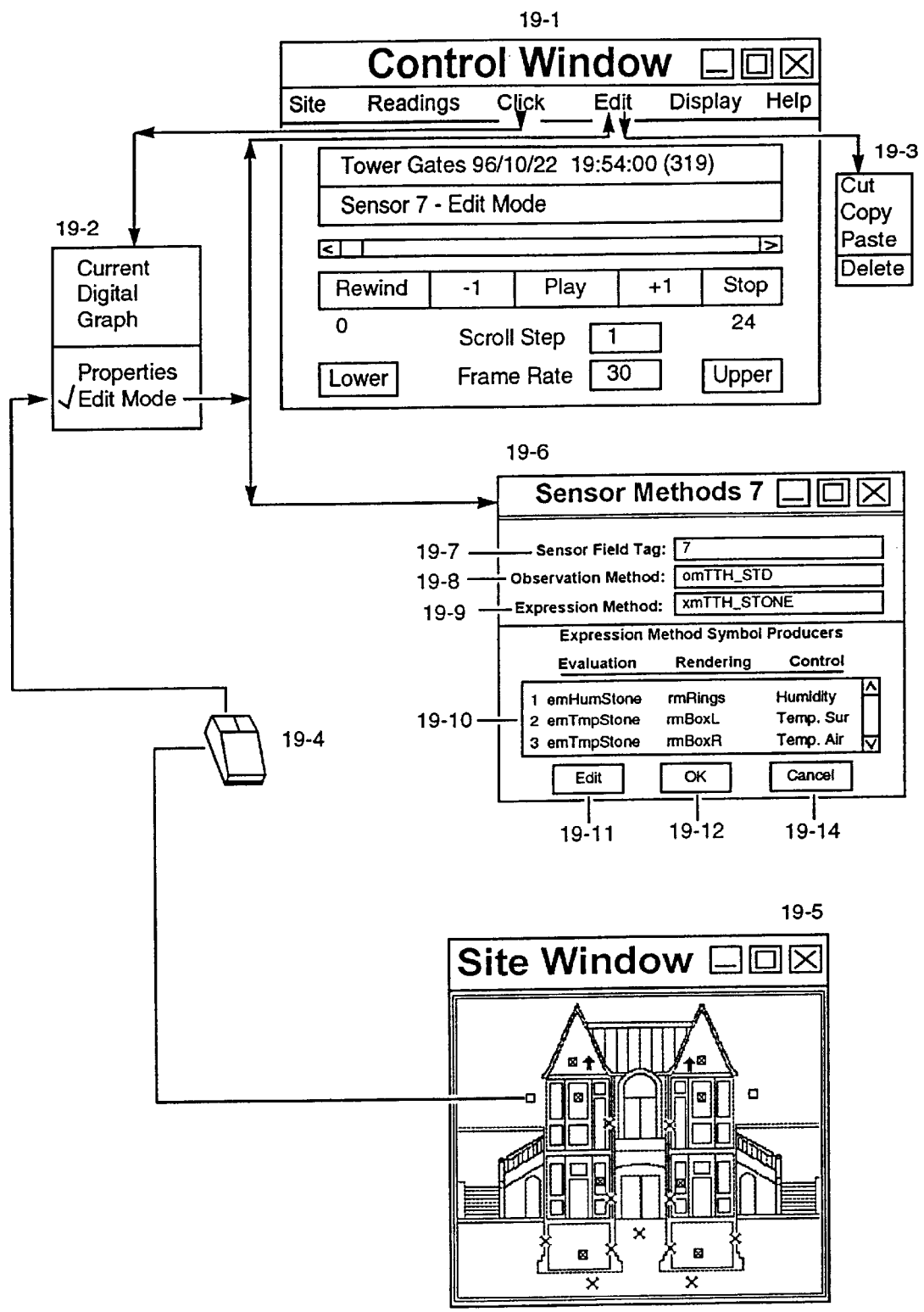
FIG. 19 is a graphic rendering of a SensiView.class Object, with the Edit Mode Menu Item of the Click Menu selected to enable the "mouse-click" modification of the component Objects of a Virtual Sensor, via a Sensor Methods Window Object which enumerates the components.

Firstly, there is a level of management which deals with how the Virtual Sensor Objects are individually configured. Each Virtual Sensor Object, as a CyberSpace Object instance of the Sensor.class, may exist in a persistent Form, which may be loaded and executed directly; or, may exist in the potential Form of a ASCII text file, which provides the construction specifications for a Sensor.class Object. As such, a SiteProfile.class Object declares and instantiates the Virtual Sensor Objects that exist with respect to the Graphic Images of the client Site, along with various Instance Variables for processing control, definition, and expression. However, it is pointless to further discuss the configuration of an individual Virtual Sensor Object until a frame of reference, i.e., a SiteProfile.class Object has been established, which is the next logical topic of discussion. Thus, the configuration of an individual Virtual Sensor Object will be addressed in the later discussion of the Edit Mode Menu Item of the Click Menu (FIG. 19). For the current discussion, it is therefore assumed that each Virtual Sensor Object is well defined and configured with respect to the client Site.

Secondly, there is a level of management which deals with a well defined collection of Virtual Sensor Objects with respect to a specific client Site. In addition to the Virtual Sensor Objects, there are Graphic Images and other means of expression which may require specification by the client and, hence, must be specified by the SiteProfile.class Object for the client Site. As a CyberSpace Object, each SiteProfile.class Object may exist in a persistent Form, which may be loaded and executed directly; or, may exist in the potential Form of a ASCII text file, which provides the construction specifications for a SiteProfile.class Object. As such, this is analogous to their, management of a collection of documents, and a standard solution is provided by a conventional series of New . . . Open . . . Save . . . Save As . . . . Close Menu Items within a File Menu, which in this context, is more appropriately called a Site Menu. Each of the SiteProfile.class Objects and Sensor.class Objects may be managed with such a Site Menu or Sensor Menu solution of Menu Items.

An extension of this solution is the implementation of Persistence for the Virtual Sensor, SiteProfile.class and ObservationReadings.class Objects, which may then be referenced by their respective URLs. Such persistent Objects may be loaded for immediate execution, as needed, by either the host platform of the CyberSpace Objects, or, programmatically from within the Sensor.class Object via an invocation of a ClassLoad( ) Method. A ClassLoad( ) Method implements the recrossing of the distinction between the content and intent of a series of distinctions, and conforms to the Form of the said Boolean Arithmetic.

Figure 10:
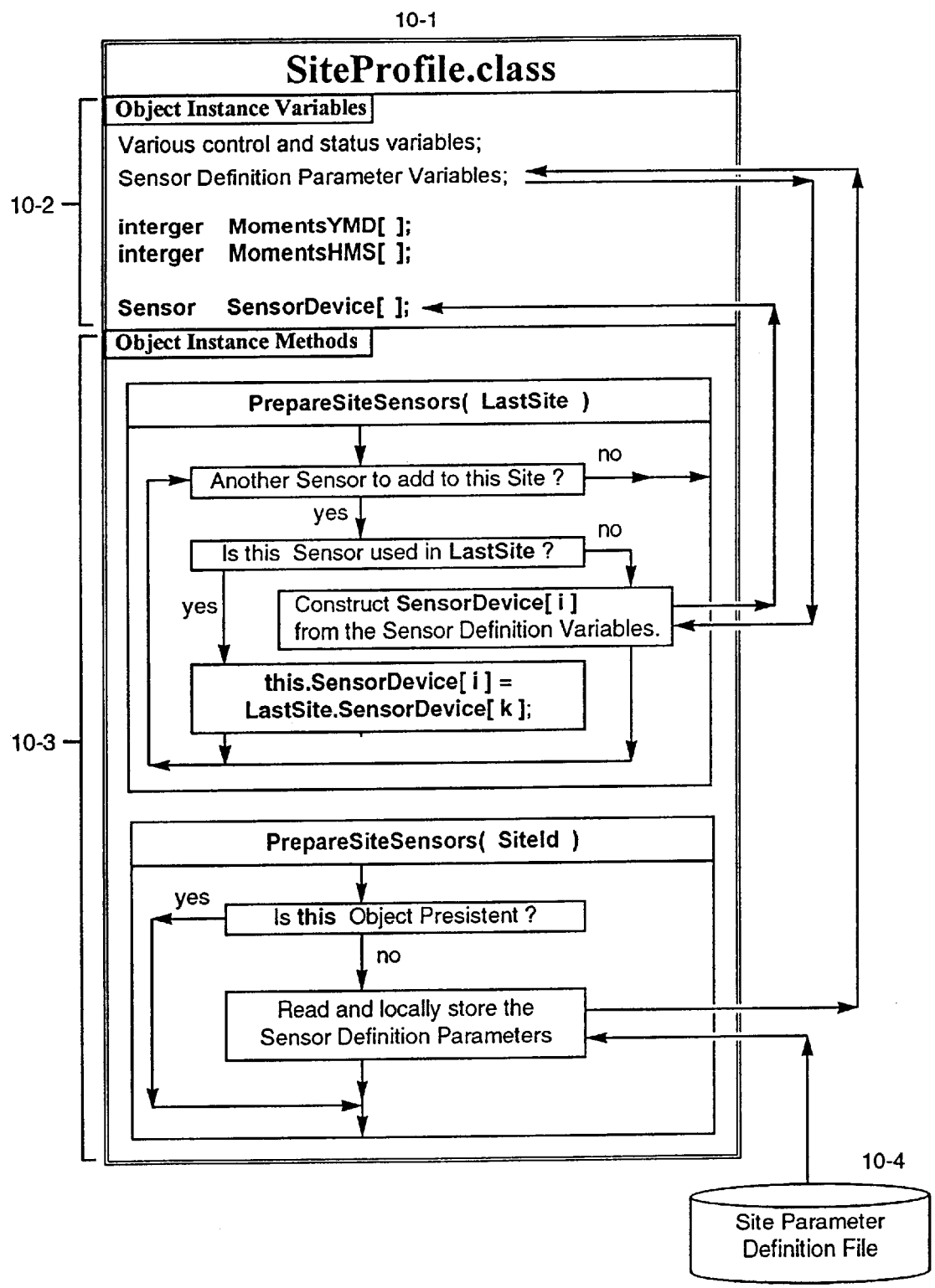
FIG. 10 is a graphic rendering of the instantiation of a SiteProfile.class Object for a Client Site.
Figure 14:
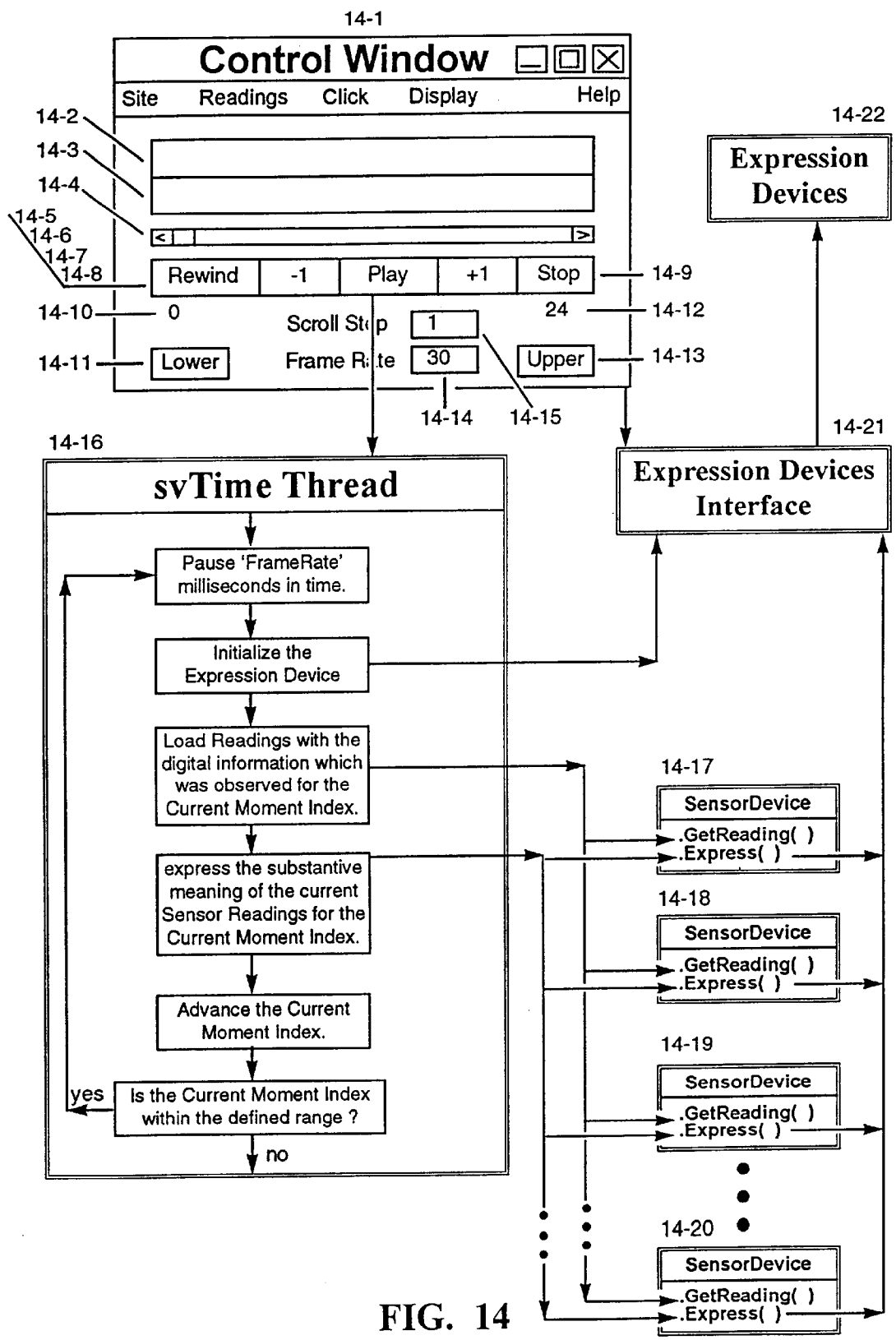
FIG. 14 is a graphic rendering of the external Form of a SensiView.class Object and the expression of a Site of Virtual Sensor Objects, driven by the svTimeThread.class Object indicated by the Play Button.

FIG. 10 provides an example of a SiteProfile.class Object 10-1 which has its own, distinct Object Instance Variables 10-2 and Object Instance Methods 10-3, respectively. A standard ASCII text file may serve as a Site Definition Parameters File 10-4. Note that the SiteProfile.class Object 10-1 declares a reference array, SensorDevice[ ] 10-21 of Virtual Sensor Objects, as instances of the Sensor.class of Objects. This is the collection of Virtual Sensor Objects which will later be referenced, by a svTimeThread.class Object of the parent SensiView.class Object, to drive their observation-expression cycle sequence over time (FIG. 14).

In FIG. 10, the PrepareSiteProfile( ) Method 10-3 illustrates the ability of a Persistent Object to indicate that it was previously loaded, and is not being created as a new instance, so exit is achieved. However, if a new instance is being created, then the Substance of the Object must be obtained from an ASCII text file 10-4, of construction specifications, as the content of the file. In such a case, the construction specifications are read in from the URL data stream of the Site Definition Parameters File 10-4 and stored into standard private memory, for subsequent reference by other Methods of the Class, as the Sensor Definition Parameter Variables 10-2, and exit is achieved.

Once the Sensor Definition Parameter Variables 10-2 in FIG. 10, have been instantiated, the PrepareSiteSensors( ) Method 10-3 may be invoked to complete the instantiation of the Sensor.class Objects for the Site. It is assumed that a parent SensiView.class Object maintains a current and previous copy of the most recently used SiteProfile.class Objects 10-1. The previous SiteProfile.class Object 10-1 is passed as the LastSite parameter to the PrepareSiteSensors( ) Method 10-3. This allows any previously instantiated Sensor.class Objects to be reused from the previous SiteProfile.class Objects 10-1. Otherwise, the SensorDevice[ ] array 10-2 element instance of a Sensor.class Object is explicitly constructed according to the Sensor Definition Parameter Variables 10-2. This looping continues until all SensorDevice [ ] array 10-2 elements have been instantiated for the current Site.

The External Form—Viewing Client Sites

Once the Form and Substance of a client Site of Virtual Sensor Objects has been expressed and defined, we have determined that the Graphic User Interface should have a Form of interaction, operation, and control that is analogous to that of a conventional media player, such as an Audio Tape, Compact Disk, or Video Cassette Player, with a like set of controls for the sequential, chronological rendition of recorded information. In this role, a SensiView.class Object provides a Site Control Window as a means for managing and expressing a set of Virtual Sensor Objects, in the Form of a SiteProfile.class Object, with respect to a client Site, where the Virtual Sensor Objects are conceptually or actually located.

The SensiView.class Object is a management shell Window Object for a graphics device and any other expression devices which may be used to render the expression of the Virtual Sensor Objects. This Object is intended to support audio, thermal, motion, general device control renderings, and other sensory expressions.

Access of a SiteProfile.class Object by the SensiView.class Object is always indicated by the presence of a SensorsCanvas.class Object which implements a general graphics Device that responds to mouse clicks which occur over an assigned Virtual Sensor location, relative to the graphic canvas and is complete. The SensorsCanvas.class Object displays the Graphic Image for the client Site and the expression of the Virtual Sensors indicated by the currently accessed SiteProfile.class Object.

Figure 11:
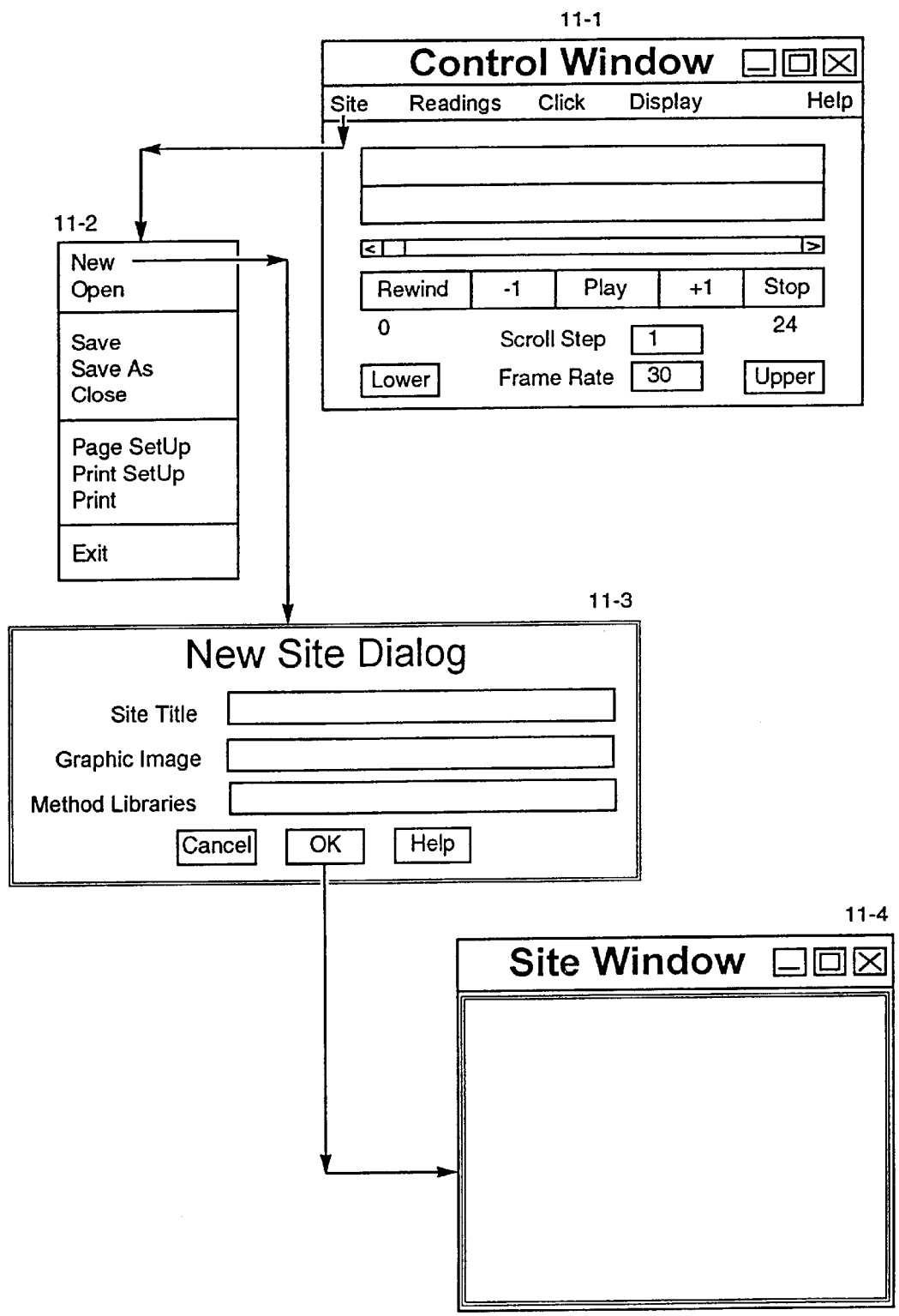
FIG. 11 is a graphic rendering of selecting the New Menu Item of the Site Menu to create a new instance of a SiteProfile.class Object.

FIG. 11 depicts User interaction with the Site Control Window 11-1 of a SensiView.class Object to create an entirely new SiteProfile.class Object without Substance, and the associated SensorCanvas.class Object which acts as the Site Window Object 11-4. Note how a, SiteProfile.class Object without Substance is manifest as a Site Window Object 11-4 with a blank image and no Virtual Sensor Objects indicated. The Site Control Window 11-1 is a graphic rendering of the external visual manifestation of a SensiView.class Object as a standard CyberSpace Window, and its implemented MenuBar and assorted ScrollBar, Button, TextField, and other Abstract Windows ToolKit Control Objects. Specifically, the New Menu Item 11-2 of the Site Menu is selected to initiate a Site specification dialog 11-3 of User interaction, for creating an entirely new instance of a SiteProfile.class Object. Once a client Site Title, Graphic Image URLs, and ClassLoad( ) Method Directory Paths have been typed in to the respective fields, and the OK button is clicked, an entirely new SiteProfile-.class Object without Substance, and the associated Site Window Object 11-4 are created.

Figure 12:
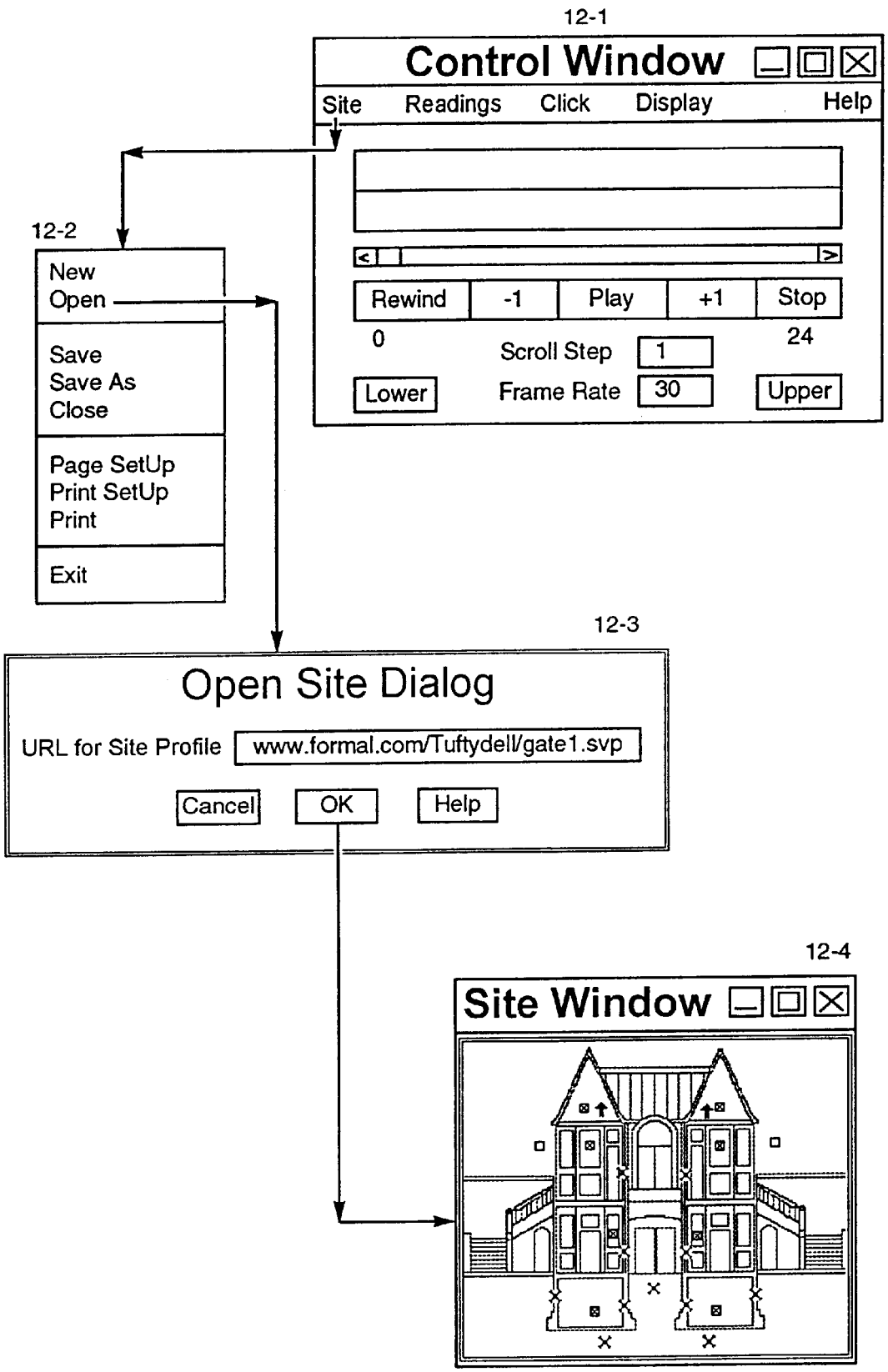
FIG. 12 is a graphic rendering of selecting the Open Menu Item of the Site Menu to access an existing instance of a SiteProfile.class Object.

FIG. 12 depicts User interaction with the Site Control Window 12-1 of a SensiView.class Object to open an existing SiteProfile.class Object, and the associated SensorCanvas.class Object which acts as the Site Window Object 12-4. The Site Control Window 12-1 is a graphic rendering of the external visual manifestation of a SensiView.class Object as a standard CyberSpace Window, and its implemented MenuBar and assorted ScrollBar, Button, TextField, and other Abstract Windows ToolKit Control Objects. Specifically, the Open Menu Item 12-2 of the Site Menu is selected to initiate a Site open dialog 12-3 of User interaction to specify an instance of a SiteProfile.class Object. Once a URL has been typed in to the respective field, and the OK button is clicked, the specified SiteProfile.class Object is instantiated and the associated Site Window Object 12-4 will display the Graphic Image for the client Site, as specified by the current SiteProfile.class Object. In this case, the SiteProfile.class indicates a Graphic Image which depicts the architectural schematic of a pair of gateway towers.

The External Form—Static Mode Observation Periods

In a practical sense, all observations are made during a specific moment of time, with respect to an arbitrary qualifier. Thus, for a Static Mode ObservationMethod.class Object, it is appropriate and useful to allow the User to specify a generalized ObservationPeriod.class Object.

FIG. 13 is a graphic rendering of a SensiView.class Object 13-1, with the Specific Menu Item 13-2 of the Readings Menu selected to define an ObservationPeriod.class Object 13-5 via a PeriodDialog.class Object, which enjoys the external Form of an Observation Period Specification Window Object 13-3. The ObservationPeriod.class Object 13-5 of a Sensor.class Object 13-4 governs what digital information may be referenced by a URL either at a remote host or on the local platform environment. The SetObservationPeriod( ) Method 13-6 of a Sensor.class Object 13-4 is used to assign the individual ObservationPeriod.class Interval Object 13-5 for the Sensor.class Object 13-4. The digital information may represent any actual or virtual observation, and may exist in any format which may be expressed. In as much as the digital information represents a sequence in time, it is always appropriate to specify a period of time with a specific "From" starting instant, and a specific "Thru", meaning "to and including", ending instant, as provided in the Observation Period Specification Window Object 13-3.

Further in FIG. 13, the Observation Period Specification Window Object 13-3 allows the entry of a so-called "Observation Qualifier" which is used to indicate a particular subset of a complete set of digital information which may exist at the client Site. Such an Observation Qualifier may appear, to a User at a client Site, as merely a "Set Id", or, alternatively, it may embody the complexity of a DataBase selection criteria. SensiView cannot anticipate all the possible client data base and file structures which a client may employ to organize and archive their digital information. However, in all cases, SensiView,can provide an Observation Period Specification Window Object 13-3 to allow the User to specify a period of time and an Observation Qualifier, for reference by any ObservationMethod.class Object which loads selected readings.

The fact, that ObservationPeriod.class Objects 13-5, in FIG. 13, exist on a per Sensor.class Object 13-4 basis, indicates that a distinct TimeLine, consisting of the ordered TimeStamps indicating the respective moments of the readings selected for a qualified observation period, exists for each given Virtual Sensor. As such, the period of time "From" the starting instant "Thru" the ending instant may be arbitrarily subdivided into mutually exclusive "Moments" within the period. Standard interpolation and morphing techniques may be applied to achieve a uniform distribution of data readings within an observation period, with respect to the other observation periods within a client Site.

Of course, for a Dynamic Mode ObservationMethod.class Object, it is unnecessary to specify a qualified observation period of time because the current moment of the current period of time, in a Dynamic Mode of observation and conscious experience, is always "now" and "here".

The External Form—The SensiView Time Thread Object

FIG. 14 include's a graphic rendering of the external Form of a SensiView.class Object as a Site Control Window 14-1, with the Play Button 14-7 indicated to signify the animation feature of the SensiView.class Object. The svTimeThread.class Object 14-16 is informally represented to clarify the cyclical and chronological nature of the Object. A Site collection of Virtual Sensor Objects 14-17, 14-18, 14-19, 14-20 are seen as autonomous Objects, whose expression 14-21, 14-22 is driven by the svTimeThread.class Object 14-16. Items 14-2 thru 14-15 constitute the AWT Control Objects which serve as the GUI. Specifically, the Stop button control Object 14-9, causes any active animation activity to cease by resetting a control variable in the svTimeThread.class Object 14-16. The Rewind button 14-5, causes the current moment of animation activity to be reset to the beginning of the current qualified observation period, when animation is ceased. Likewise, the −1 button 14-6 and the +1 button 14-8, causes the current moment of animation activity to be advanced or retreated one moment, when animation is ceased. At any time, the Lower 14-11 and Upper 14-13 buttons may be clicked to record the index of the current moment immediately above the respective button as 14-10 and 14-12.

The svTimeThread.class Object 14-16 is constructed so as to indefinitely repeat and cycle through the observation period as restricted by the Lower and Upper values 14-10, 14-12 so indicated. The Scrollbar 14-4 provides a convenient mechanism for quickly moving to an arbitrary moment among the moments of the current qualified observation period. A click on either of the step arrows of the Scrollbar 14-4 will cause an advance or retreat of "Scroll Step" moments 14-15, when animation is ceased. The animation frame rate 14-14 is specified as moments per second. The text label areas 14-2, 14-3 are used to display current moment information and various status information.

In FIG. 14, the substantive logic of the svTimeThread-.class Object 14-16 is informally presented as a flowchart of the Callback Method that is driven by the TimeThread. Repeatedly, after pausing a fixed period of time corresponding to the animation frame rate 14-14, the Callback Method will invoke the GetReading( ) and Express( ) Methods of each Virtual Sensor 14-17, 14-18, 14-19, 14-20, with respect to a Graphic Image of the Site location of the Virtual Sensors. Prior to the expression of the Virtual Sensor 14-17, 14-18, 14-19, 14-20, the CallBack Method 14-16 will perform any required initialization or buffering of the Expression Device 14-22 via the Expression Device Driver Interface 14-21. Once the expression is completed, the moment index is incremented, with respect to the Upper 14-12 and Lower 14-10 limits, and animation continues indefinitely.

While the animation of the svTimeThread.class Object 14-16 and the Site Window 12-4 present a wealth of visual insight over time, it is occasionally desirable to focus on the readings of a specific moment. In such case, the User clicks on the Stop button 14-9 of the Site Control Window 14-1 and then clicks on the location of the Virtual Sensor of interest within the Site Window 12-4. The selection of the Click Menu Item (FIGS. 15, 16, 17, 18, 19) determines the subsequent action.

The External Form—The Click Current Menu Item

Figure 15:
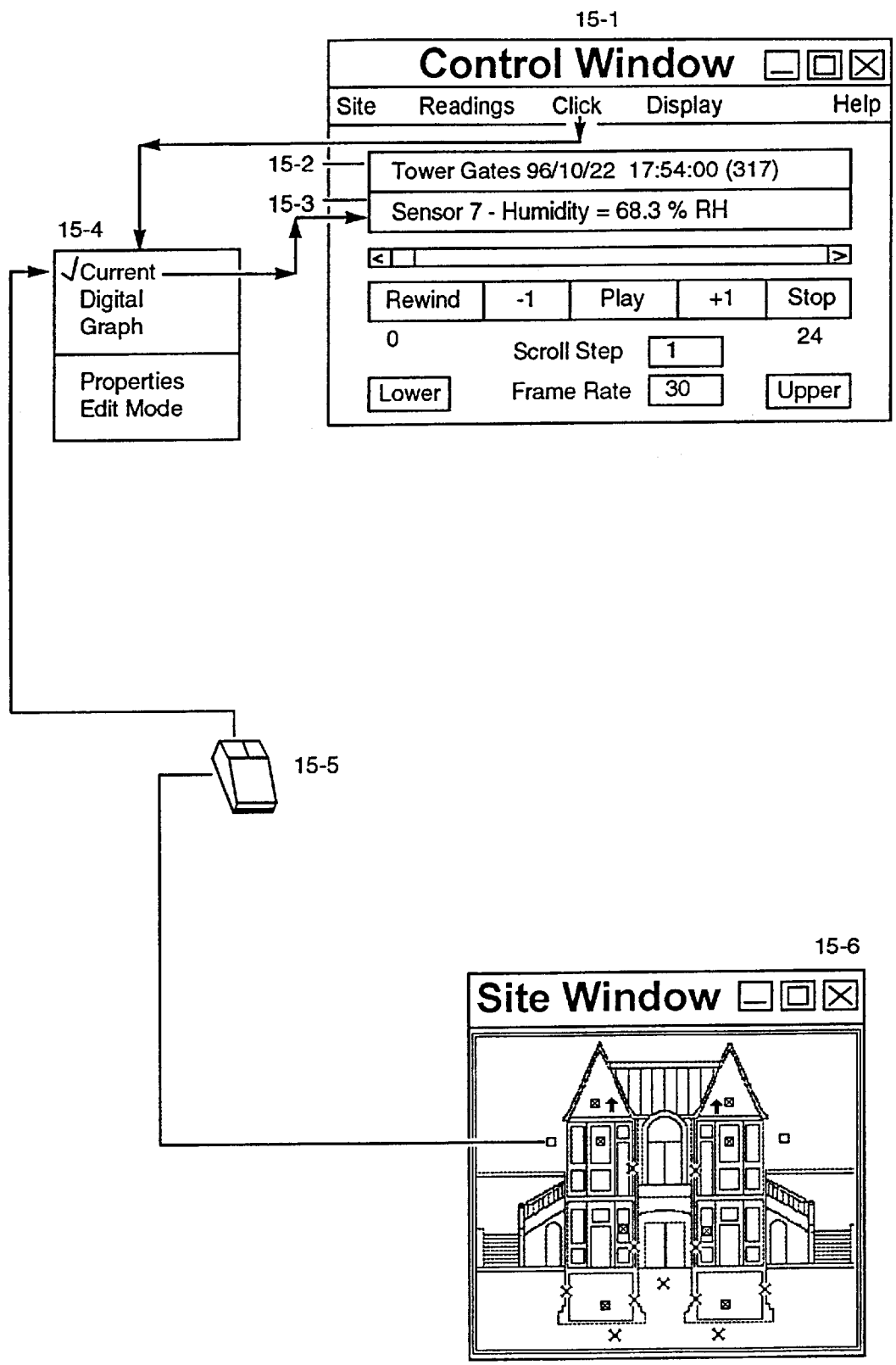
FIG. 15 is a graphic rendering of a SensiView.class Object, with the Current Menu Item of the Click Menu selected to enable the "mouse-click" display of the current moment of readings for a Virtual Sensor.

FIG. 15 depicts User interaction, via a standard Mouse Device 15-5, with the Site Window 15-6 of the SensorCanvas.class Object of the Site Control Window 15-1 of a SensiView.class Object, when the Current Menu Item of the Click Menu 15-4 is selected to enable the display of the current moment 15-2 of reading values 15-3 for the Virtual Sensor whose location is clicked 15-5 within the Site Window 15-6.

The implementation of this feature is achieved via the HandleEvent( ) Method of the SensorCanvas.class Object processing Mouse Device events, so as to display the numeric values 15-3 associated with the current moment 15-3 of ObservationReadings Readings 2-2, when a click event is detected over the location of the respective Virtual Sensor with respect to the Site Graphic Image.

The External Form—The Click Digital Menu Item

Figure 16:
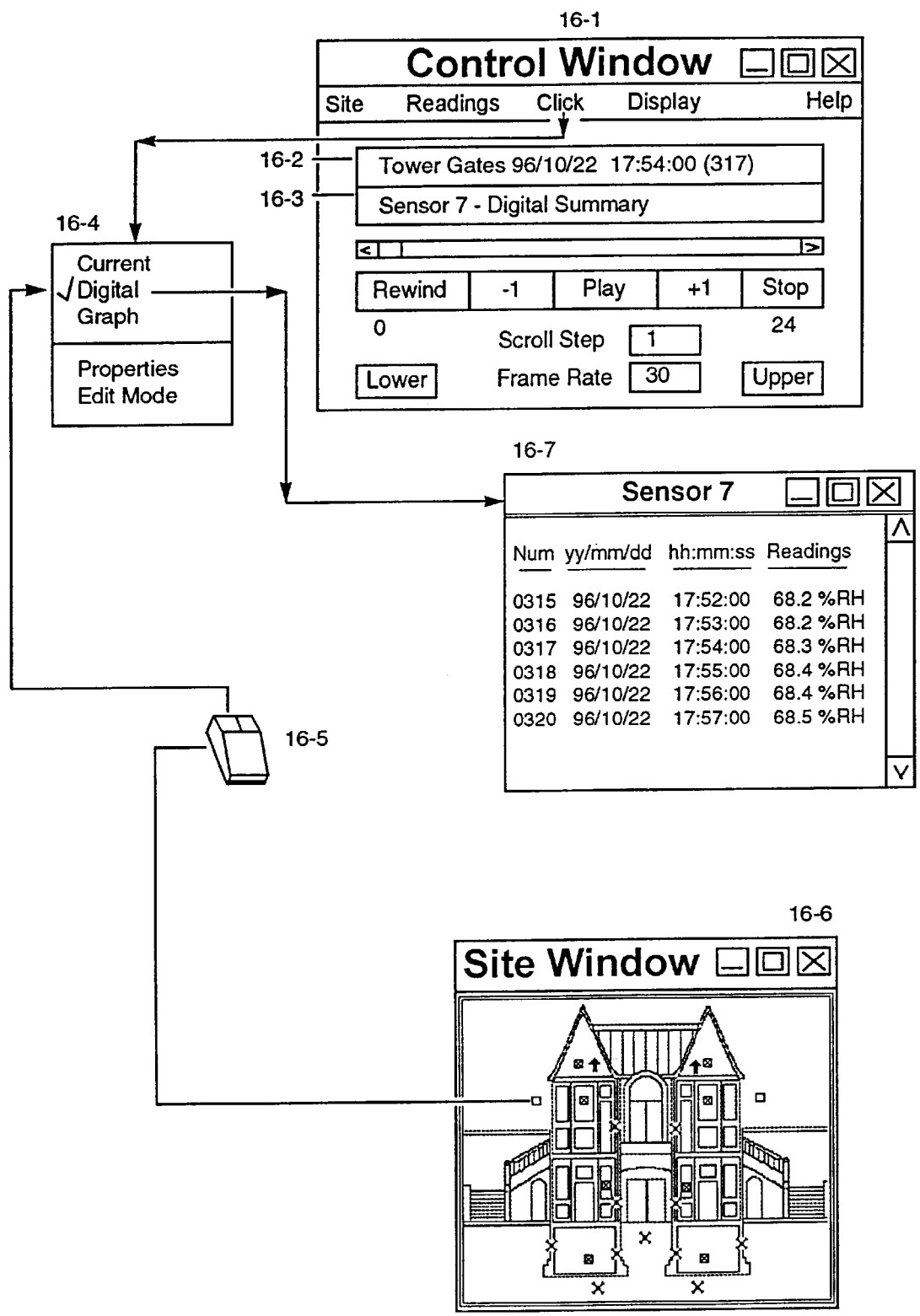
FIG. 16 is a graphic rendering of a SensiView.class Object, with the Digital Menu Item of the Click Menu selected to enable the "mouse-click" digital display of all moments of readings for a Virtual Sensor.

FIG. 16 depicts User interaction, via a standard Mouse Device 16-5, with the Site Window 16-6 of the SensorCanvas.class Object of the Site Control Window 16-1 of a SensiView.class Object, when the Digital Menu Item of the Click Menu 16-4 is selected to enable the digital display 16-3 of all moments 16-7 of reading values 2-2 for the Virtual Sensor whose location is clicked 16-5 within the Site Window 16-6.

The implementation of this feature is achieved via the HandleEvent( ) Method of the SensorCanvas.class Object processing Mouse Device events, so as to display all moments 16-7 of the reading values of the Observation-Readings Readings 2-2, when a click event is detected over the location of the respective Virtual Sensor with respect to the Site Graphic Image.

The External Form—The Click Graph Menu Item

Figure 17:
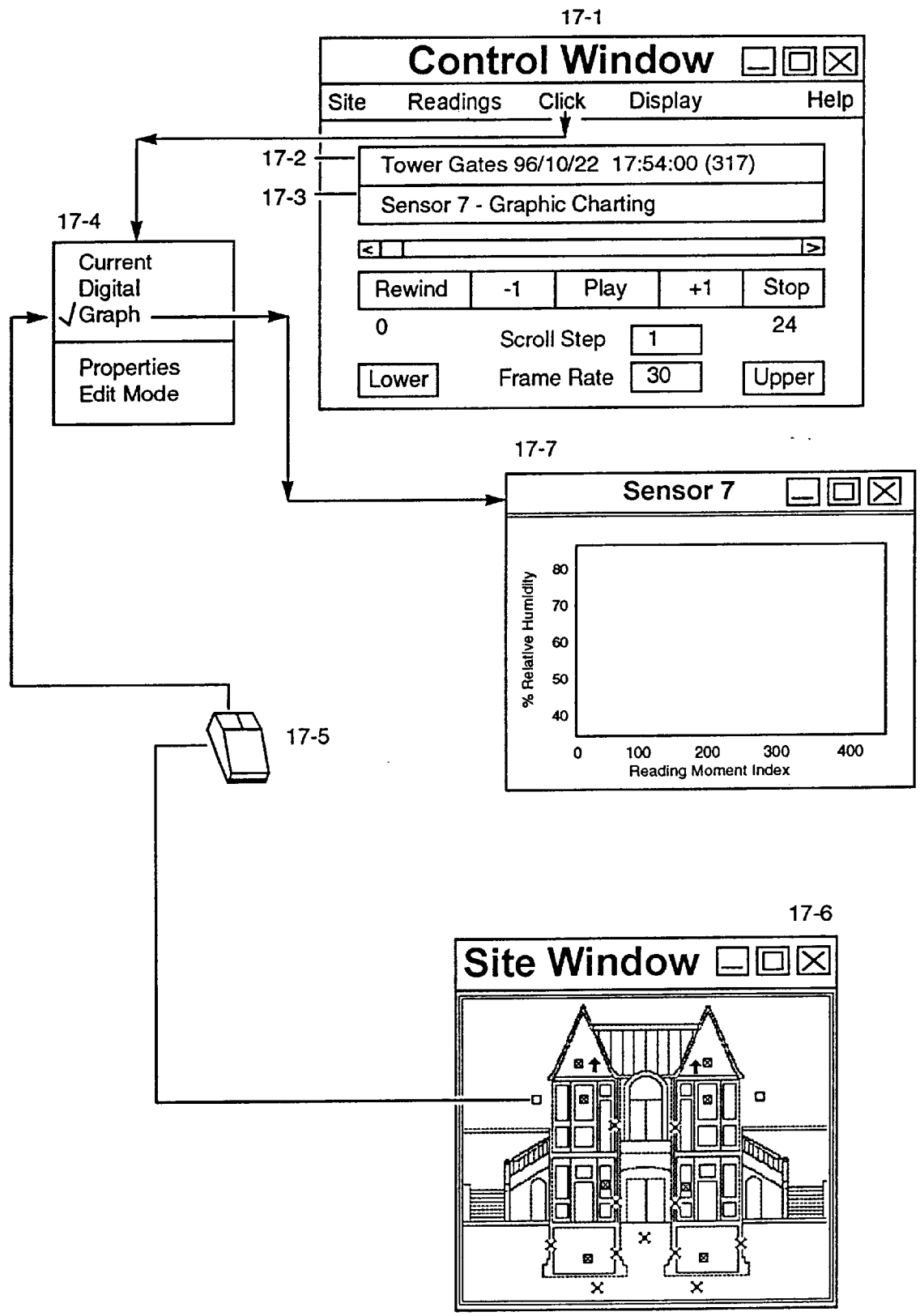
FIG. 17 is a graphic rendering of a SensiView.class Object, with the Graph Menu Item of the Click Menu selected to enable the "mouse-click" graphic charting of all moments of readings for a Virtual Sensor.

FIG. 17 depicts User interaction, via a standard Mouse Device 17-5, with the Site Window 17-6 of the SensorCanvas.class Object of the Site Control Window 17-1 of a SensiView.class Object, when the Graph Menu Item of the Click Menu 17-4 is selected to enable the graphic charting 17-3 of all moments 17-7 of reading values 2-2 for the Virtual Sensor whose location is clicked 17-5 within the Site Window 17-6.

The implementation of this feature is achieved via the HandleEvent( ) Method of the SensorCanvas.class Object processing Mouse Device events, so as to graphical chart all moments 17-7 off the reading values of the Observation-Readings Readings 2-2, when a click event is detected over the location of the respective Virtual Sensor with respect to the Site Graphic Image.

The External Form—The Click Properties Menu Item

Figure 18:
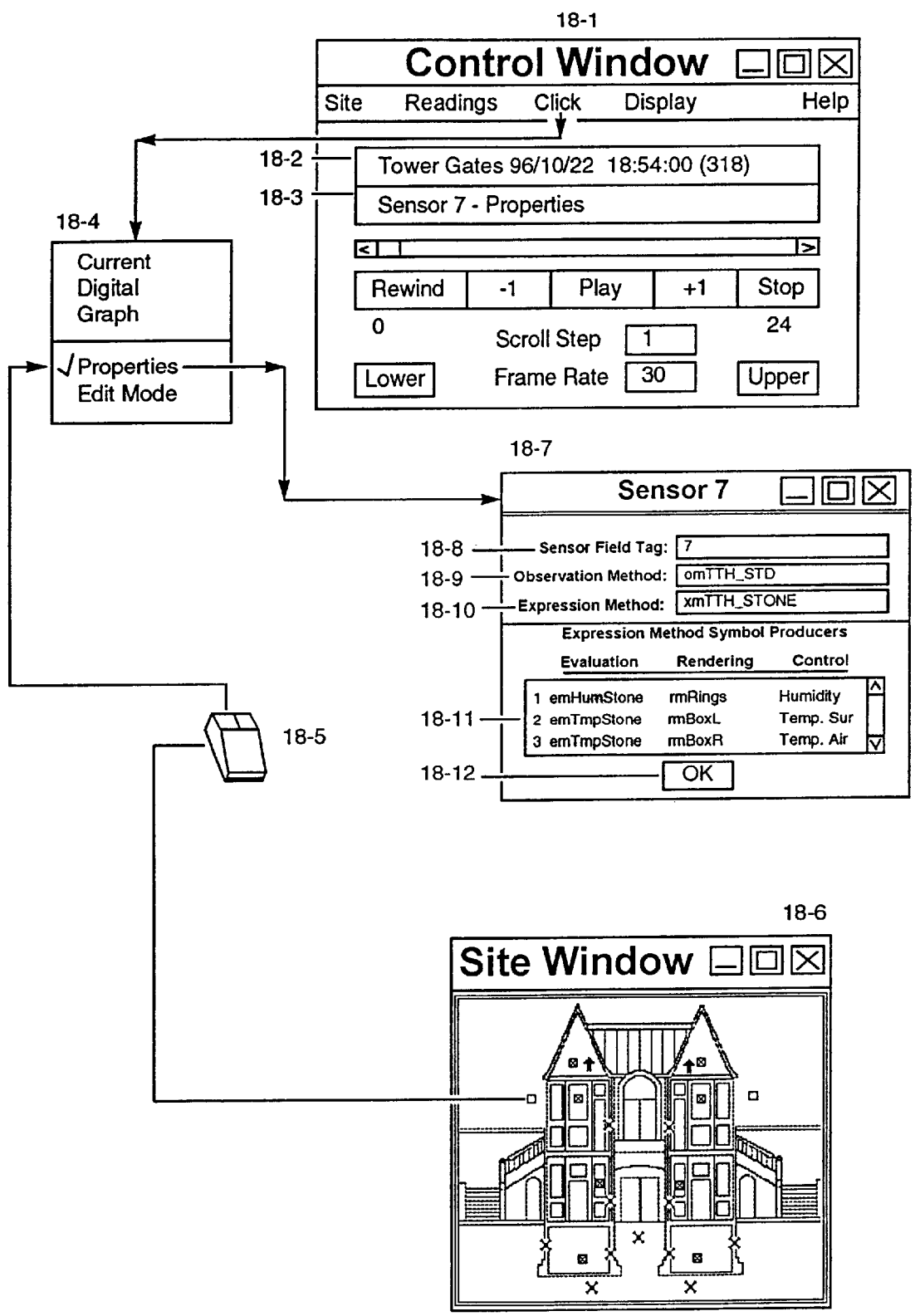
FIG. 18 is a graphic rendering of a SensiView.class Object, with the Properties Menu Item of the Click Menu selected to enable the "mouse-click" identification of the component Objects of a Virtual Sensor, via a Sensor Methods Window Object which enumerates the components.

FIG. 18 depicts User interaction, via a standard Mouse Device 18-5, width the Site Window 18-6 of the Sensor-Canvas.class Object of the Site Control Window 18-1 of a SensiView.class Object, when the Properties Menu Item of the Click Menu 18-4 is selected to enable the identification 18-7 of the component Objects of the Virtual Sensor whose location is clicked 18-5 within the Site Window 18-6. The component Objects of the indicated Virtual Sensor are displayed 18-7 as: the Sensor Field (Identification) Tag 18-8, the Class name of the ObservationMethod.class Object 18-9, and the Class name of the ExpressionMethod.class Object 18-10, and the AWT ListBox Object 18-11 list of pairs of EvaluationMethod.class Objects and RenderingMethod-.class Objects which define the individual symbols of expression for the Virtual Sensor. When the User has completed their viewing of the Properties, the OK 18-12 button may be clicked to close the display window 18-7.

The implementation of this feature is achieved via the Handle Event( ) Method of the SensorCanvas.class Object processing Mouse Device events, so as to display the component Objects 6-2 and 6-5 of the Virtual Sensor, when a click event is detected over the location of the respective Virtual Sensor with respect to the Site Graphic Image.

The External Form—The Click Edit Mode Menu Item

FIG. 19 depicts User interaction, via a standard Mouse Device 19-4, with the Site Window 19-5 of the SensorCanvas.class Object of the Site Control Window 19-1 of a SensiView.class Object, when the Edit Mode Menu Item of the Click Menu 194-2 is selected to enable the identification 19-6 of the component Objects of the Virtual Sensor whose location is clicked 19-4 within the Site Window 19-5. The component Objects of the indicated Virtual Sensor are displayed 19-6 as: the Sensor Field (Identification) Tag 19-7, the Class name of the ObservationMethod.class Object 19-8, and the Class name of the ExpressionMethod.class Object 19-9, and the AWT ListBox Object 19-10 list of pairs of EvaluationMethod.class Objects and RenderingMethod- .class Objects which define the individual symbols of expression for the Virtual Sensor. Note that an Edit Menu 19-3 is included on the MenuBar for Edit Mode of operation which allows to Cut, Copy, Paste, and Delete complete Virtual, Sensor Objects, with respect to the client Site Window Object.

The component Objects may be edited by using the Mouse Device 19-4 to place the input focus on the component information of interest and then clicking the Edit button 19-11. When the User has completed their editing of the components, the OK button 19-12 may be clicked to close the display window 19-6. Alternatively, the Cancel button 19-13 may be clicked at any time to revert the Virtual Sensor to its prior configuration.

The implementation of this feature is achieved via the HandleEvent( ) Method of the SensorCanvas.class Object processing Mouse Device events, so as to display the component Objects 6-2 and 6-4 of the Virtual Sensor, when a click event is detected over the location of the respective Virtual Sensor with respect to the Site Graphic Image.

The External Form—The Observation Method Editor Window

Figure 20:
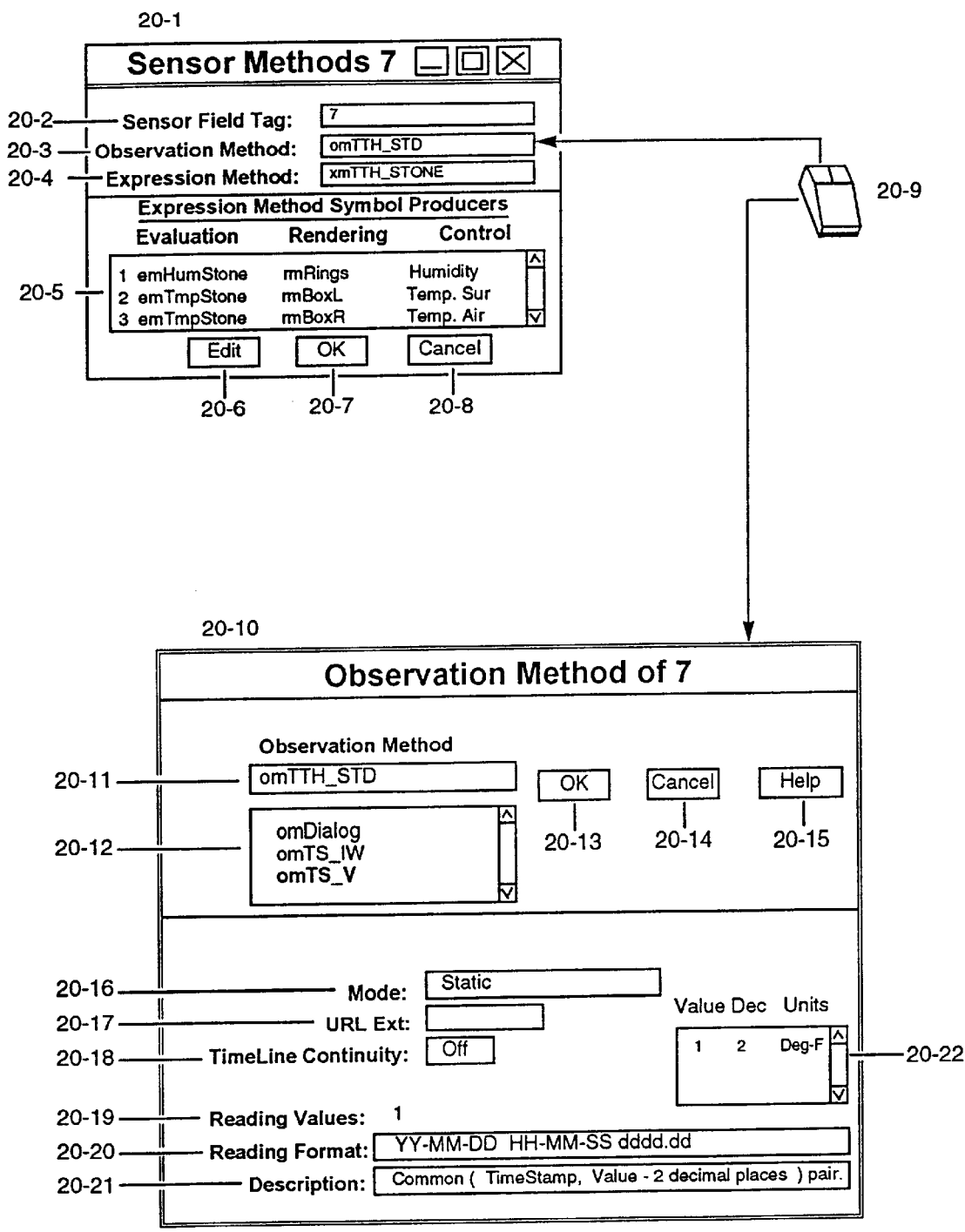
FIG. 20 is a graphic rendering of a Sensor Methods Window Object, with the name field of the Observation Method clicked to enable specification and modification of the om__.class Object used by the Virtual Sensor, via a Observation Method editor Window Object.

FIG. 20 is a graphic rendering of a Sensor Methods Window Object 20-1, with the name field of the ObservationMethod.class Object 20-3 clicked to enable specification and modification, of the om__.class Object used by a Virtual Sensor, via a Observation Method editor Window Object 20-10. The component Objects of the Virtual Sensor are displayed as: the Sensor Field (Identification) Tag 20-2, the Class name of the ObservationMethod.class Object 20-3, the Class name of the ExpressionMethod.class Object 20-4, and the AWT ListBox Object 20-5 list of pairs of Evaluation-Method.class Objects and RenderingMethod.class Objects which define the individual symbols of expression for the Virtual Sensor. The ObservationMethod.class Object 20-3, is selected for editing by use of the Mouse Device 20-9 and then by clicking the Edit button 20-6. When the User has completed their editing of the components, the OK button 20-7 may be clicked to close the Sensor Methods Window Object 20-1. Alternatively, the Cancel button 20-8 may be clicked at any time to revert the Virtual Sensor to its prior configuration.

Beyond the Sensor Methods Window Object 20-1, in FIG. 20, the Observation Method editor Window Object 20-10 provides an interface which allows selection 20-11 from the list of all the om__.classes 20-12 which are available for the client Site. The specifications and options for the selected om__.class 20-11 are detailed as the operational Mode 20-16, a URL target Object extension 20-17, TimeLine Continuity options 20-18, the number of distinct values observed per reading 20-19, the format of the digital information observed by the URL target Object 20-20, a description 20-21 of the currently selected Method, and the precision and dimensionality of the observed reading 20-22. Note that some concepts, such as dimensionality, may be inappropriate to graphic, audio, etc. formats. When the User has completed their editing of the Observation Method, the OK button 20-13 may be clicked to close the editor window 20-10. Alternatively, the Cancel button 20-14 may be clicked at any time to revert to previously defined Observation Method, or, the Help button 20-15 may be clicked at any time to obtain additional information regarding the options available.

Each__Method.class-type Class of Object supports a Description( ) Method to describe the properties that an Object of the Class enjoys. Note that certain properties may impact the selection process or otherwise constrain the selection of other candidate__Method.class-type Objects within a given Virtual Sensor. Examples of such constraints are the number of digits precision carried by a numeric value, the dimensionality of the measured quantity and the number of values observed per Reading Moment.

The External Form—The ExpressionMethod Editor Window

Figure 21:
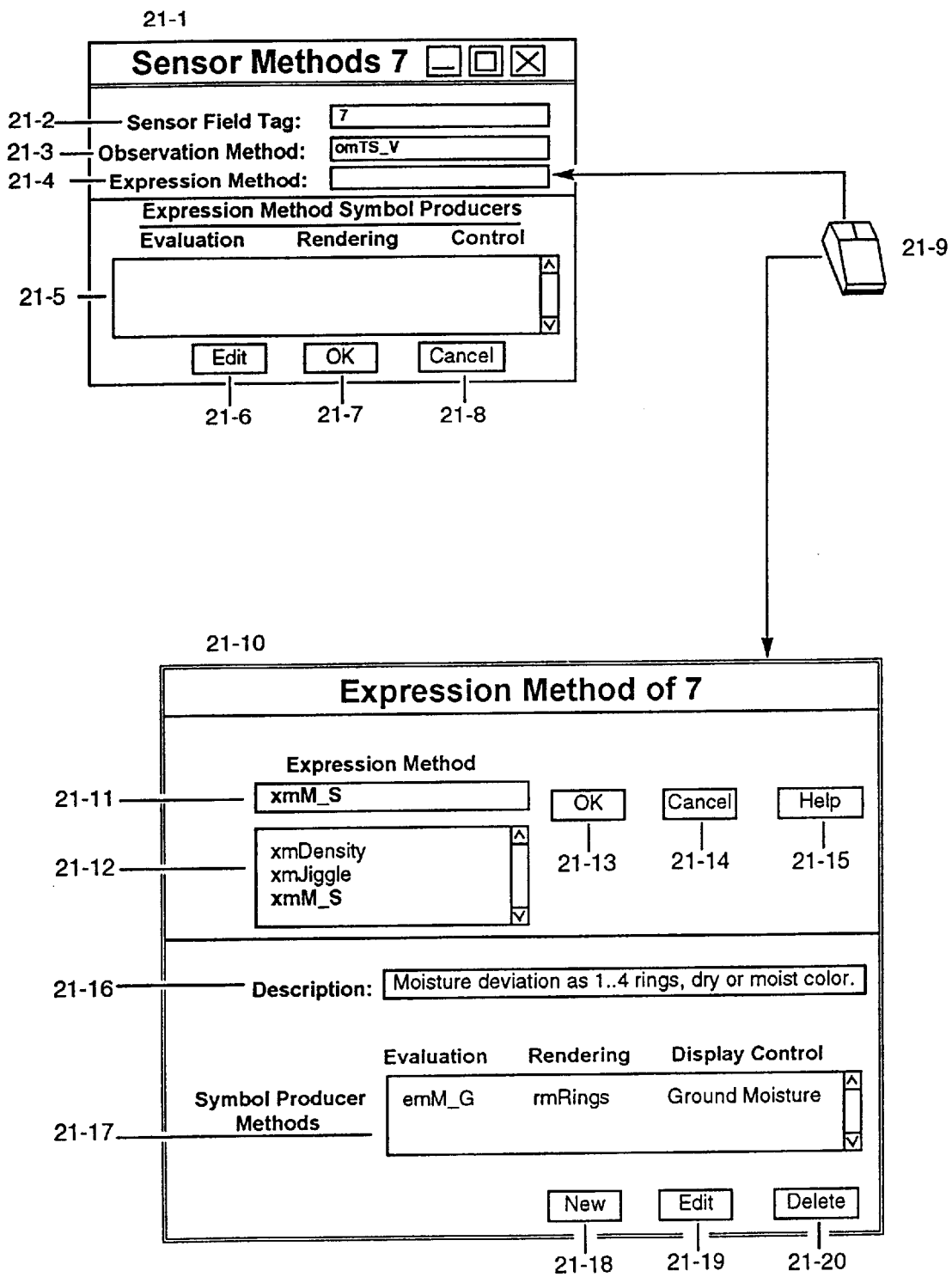
FIG. 21 is a graphic rendering of a Sensor Methods Window Object, with the name field of the Expression Method clicked to enable specification and modification of the xm__.class Object used by the Virtual Sensor, via a Expression Method editor Window Object.

FIG. 21 is a graphic rendering of a Sensor Methods Window Object 21-1, with the name field of the ExpressionMethod.class Object 21-3 clicked to enable specification and modification, of the xm__.class Object used by a Virtual Sensor, via an Expression Method editor Window Object 21-10. The component Objects of the Virtual Sensor are displayed as: the Sensor Field (Identification) Tag, 21-2, the Class name of the ObservationMethod.class Object 21-3, the Class name of the ExpressionMethod.class Object 21-4, and, a ListBox Object 21-5 list of the defined pairs of EvaluationMethod.class Objects and RenderingMethod.class Objects which produce the individual symbols of expression for the Virtual Sensor. The ExpressionMethod.class Object 21-4, is selected for editing by use of the Mouse Device 21-9 and then by clicking the Edit button 21-6. When the User has completed their editing of the components, the OK button 21-7 may be clicked to close the Sensor Methods Window Object 21-1. Alternatively, the Cancel button 21-8 may be clicked at any time to revert the Virtual Sensor to its prior configuration.

Beyond the Sensor Methods Window Object 21-1, in FIG. 21, the Expression Method editor Window Object 21-10 provides an interface which allows selection 21-11 from the list of all the xm__.classes 21-12 which are available for the client Site. The specifications and options for the selected xm__.class 21-11 are detailed by a description 21-16 of the currently selected Method and a Listbox of the EvaluationMethod.class and RenderingMethod.class Object pairs 21-17 which produce the symbols which will constitute an expression. This specific example depicts a Virtual Sensor whose Observation Method was just replaced with an omTS__V.class ObservationMethod.class Object 21-3, whereas a new, compatible Expression Method must be specified.

When the User has completed their editing of the Expression Method, the OK button 21-13 may be clicked to close the editor window 21-10. Alternatively, the Cancel button 21-14 may be clicked at any time to revert to previously defined Expression Method, or, the Help button 21-15 may be clicked at any time to obtain additional information regarding the options available.

The User may add, modify, or delete a symbol from the Expression Method by selecting a Symbol Pair from the list of all the xm__.classes 21-12 which are available, and clicking the New button 21-18, the Edit button 21-19, or, the Delete button 21-20, respectively. When the New button 21-18 or the Edit button 21-19 is then clicked, a Symbol Pair editor Window Object 22-9 will be displayed for the target Symbol Pair.

The External Form—The Symbol Pair Editor Window

Figure 22:
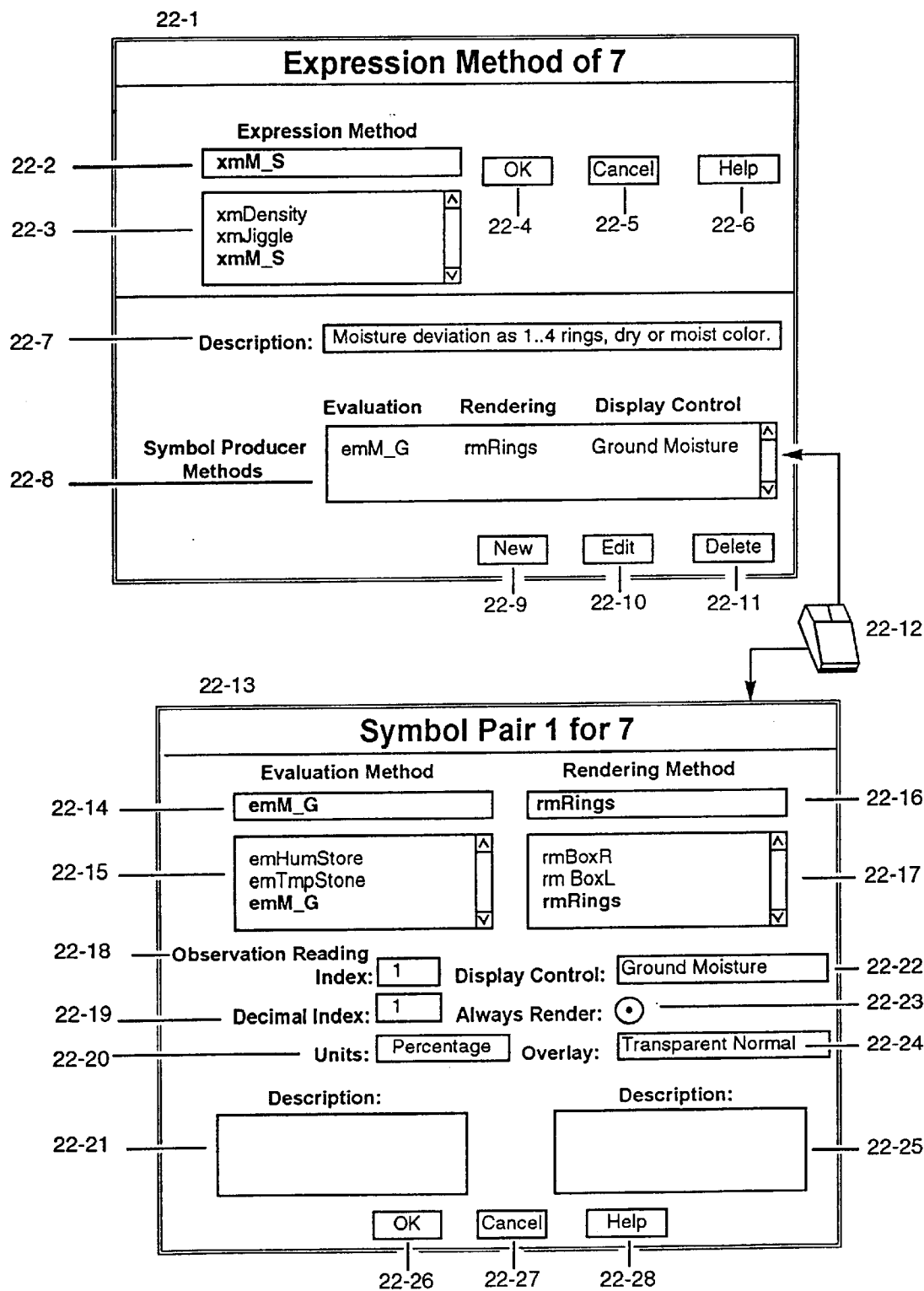
FIG. 22 is a graphic rendering of a Expression Method Window Object, with a row of the Symbol Producer Methods clicked to enable specification and modification of the em__.class Object and rm__.class Object which produce the Expression Symbol, via a Symbol Pair editor Window Object.

FIG. 22 is a graphic rendering of an Expression Method editor Window Object 22-1 provides an interface which allows selection 22-2 from the list of all the xm__.classes 22-3 which are available for the client Site. The specifications and options for the selected xm__.class 22-2 are detailed by a description 22-7 of the currently selected Method and a Listbox of the EvaluationMethod.class and RenderingMethod.class Object pairs 22-8 which produce the symbols which will constitute an expression. The User may add, modify, or delete a symbol from the Expression Method by selecting a Symbol Pair from the Listbox of all the xm__.classes 22-3 which are available, and clicking the New button 22-9, the Edit button 22-10, or, the Delete button 22-11, respectively. This specific example depicts a Virtual Sensor whose Expression Method is specified as an xmM__S ExpressionMethod.class Object 22-3, which has been selected by a click of the Mouse Device 22-12 for modification, via a Symbol Pair editor Window Object 22-13. When the User has completed their editing of the Expression Method, the OK button 22-4 may be clicked to close the editor window 22-1. Alternatively, the Cancel button 22-5 may be clicked at any time to revert to previously defined Expression Method, or, the Help button 22-6 may be clicked at any time to obtain additional information regarding the options available.

For the Symbol Pair 22-8 thusly selected 22-12 in FIG. 22, a Symbol Pair editor Window Object 22-13 is opened and the constituent Evaluation 22-14 and Rendering 22-16 Methods are displayed. Along with the name 22-14 of the constituent Evaluation Method, a Listbox Control of all available em__.classes 22-15 is displayed, and likewise, along with the name 22-16 of the constituent Rendering Method, a Listbox of all available rm__.classes 22-17 is displayed.

For the Evaluation Method 22-14, an Observation Readings Index 22-18 is specified to indicate which specific value, within a reading for a moment, is to be used as the Substance to be passed to the Evaluation Method 22-14 of the Virtual Sensor. Necessarily, the thusly selected specific value within a reading 22-18 then determines the Form of the interface requirements for the classes of em__.class Objects 22-15 which may accept such Substance, typically in the Form of an ObservationReadings.class Object 1-13. The number of Decimal Places 22-19 and Units 22-20 allow a normalization of precision and conversion of dimensional units to be performed, respectively, by the em__.class Objects 22-15. The options available via the Units Edit Control 22-20 include an extensive list of conventional physical dimensional units, and an extension of the concept into the CyberSpace virtual reality of internal Forms and formats as a dimension, with units of measure such as GIF, JPG, MPEG, AVI, and other various MIME formats. Appropriate conversion, transformation, and other management functions options are provided as per the requirements of the specific format, in accordance with a fully parameterized canonical GUI. A description 22-21 of the Evaluation Method 22-14 is also provided.

For the Rendering Method 22-16, a Display Control Edit Control 22-22 allows the client User to specify a Display Control name which will be used to create an AWT CheckboxMenuItem Object that may be integrated into a GUI, such as a SensiView.class Object client Site Control Window 11-1. The menu of all such Display Control Objects is presented on the Site Control Window 11-1 as the Display Menu. The Always Render Pushbutton Control 22-23 allows the client User to specify that the Rendering Method 22-16 should be invoked even when the Evaluation Method 22!-14 indicates a 'null' or 'normal' evaluation. The Overlay Edit Control 22-24 indicates the nature of Device masking to be performed during the expression process. For graphic Devices, such as a CRT, kit various levels of transparency and styles of masking filters are available. A description 22-25 of the Evaluation Method is also provided.

When the client User has completed their editing of the Symbol Pair 22-13, the OK button 22-26 may be clicked to close the Symbol. Pair editor Window Object 22-13. Alternatively, the Cancel button 22-27 may be clicked at any time to revert to previously defined Expression Method, or, the Help button 22-28 may be clicked at any time to obtain additional information regarding the options available.

Network Platforms

Figure 23:
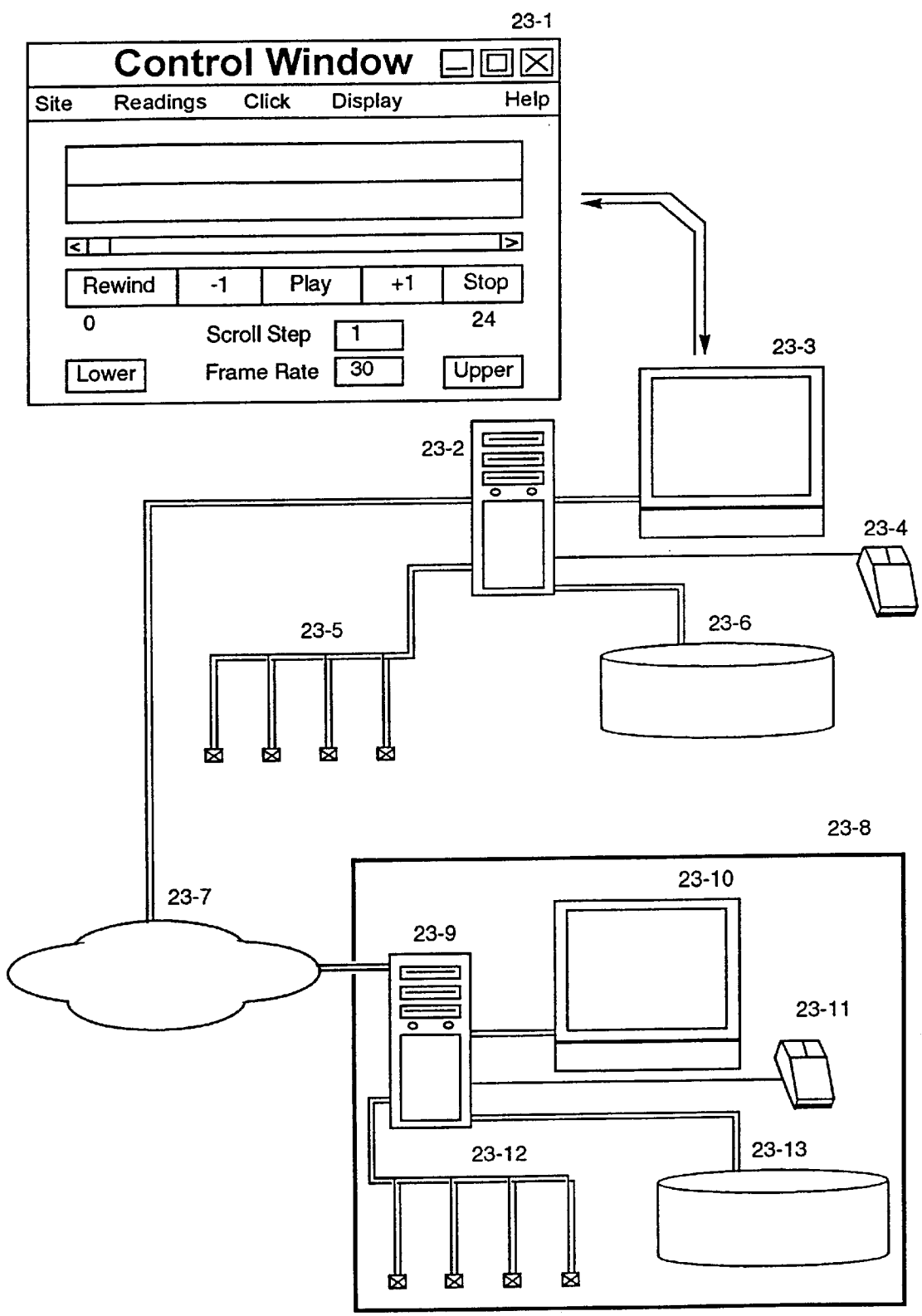
FIG. 23 is a graphic rendering of a preferred hardware configuration where the central window is displayed.

Whereas all SensiView components are formulated as Objects in CyberSpace, in FIG. 23, the InterNet 23-7 may be regarded as a transport mechanism for communication of content messages and intent instructions among and between the Objects. As such, the SensiView Control Window 23-1, displays the external form of the SensiView.class Object on the client user's local computer 23-2 display terminal 23-3. Also connected to the client user's logical computer 23-2 is a mouse device 23-4, a series of sensor probes 23-5 for actively acquiring data for observation and expression in real-time, and a local disk storage device 23-6 for archive storage of the observed readings as digitized information.

In turn, a comparable computer 23-8 configuration may likewise be connected to the InterNet 23-7 and be accessible via standard InterNet 23-7 protocols for communications, such as TCP/IP, SLIP, PPP, etc. The comparable remote computer 23-8 configuration, likewise, has a display terminal 23-9, a mouse device 23-10, a series of sensor probes 23-11 for actively acquiring data for observation and expression in real-time, and a local disk storage device 23-12 for storing the observed readings as digitized information. The Universal Resource Locator (URL) provides a means of access to any digitized information which may exist on any such disk storage devices 23-6, 23-12 which are thusly connected to the InterNet. The specific device drivers for the sensor probes 23-5, 23-11 will determine the remote control capabilities of the specific sensor probes in a real-time mode of operation. However, such a remote configuration can always record the acquired observation reading to the local disk storage device 23-12 for later access.

Figure 24:
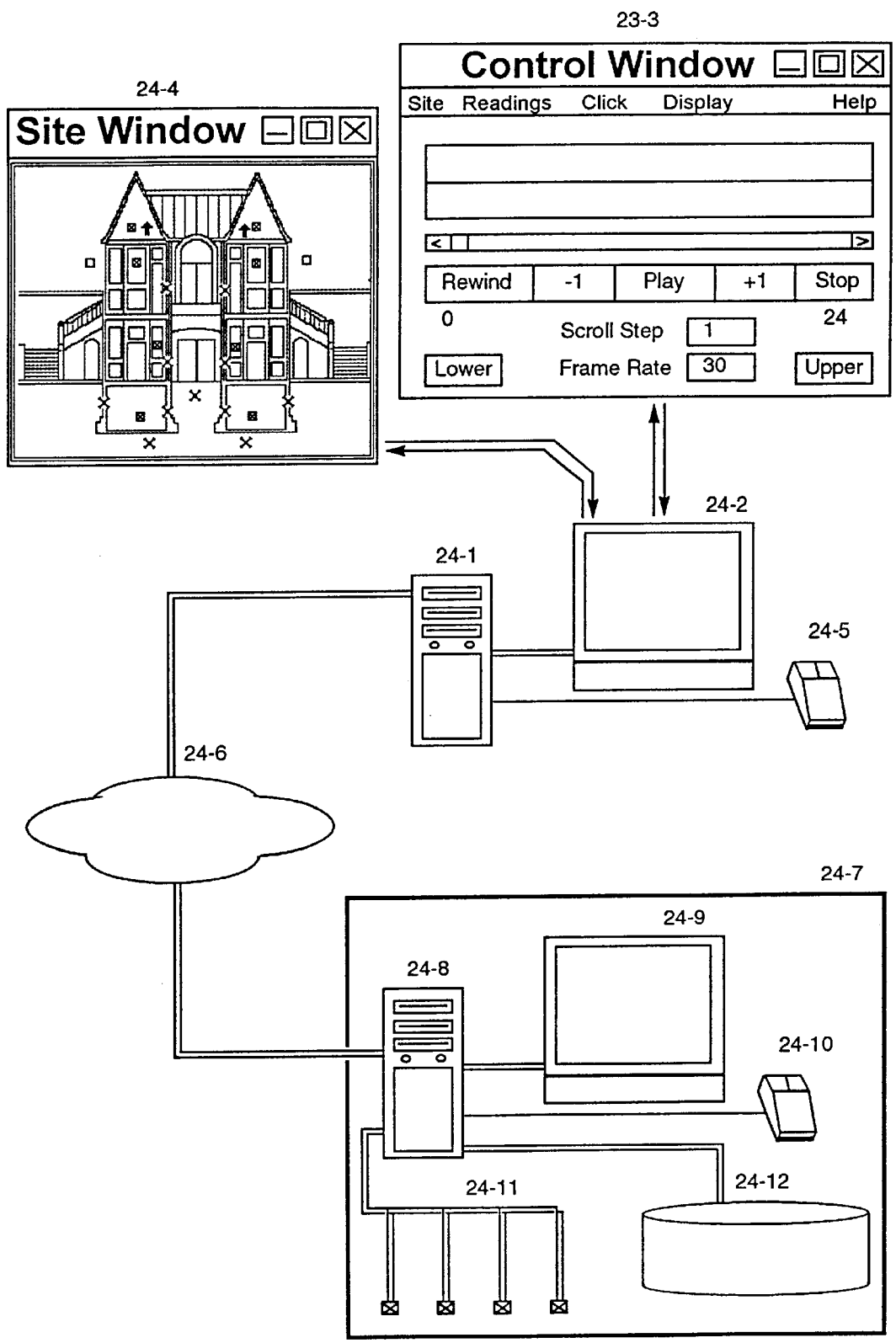
FIG. 24 is a graphic rendering of the preferred hardware configuration of FIG. 23 where the site window has been opened via the control window.

Further, because all SensiView components are formulated as Objects in CyberSpace, in FIG. 24, the InterNet 24-6 may be regarded as a transport mechanism for communication of content messages and intent instructions among and between the Objects. As such, the SensiView Control Window 24-3, displays the external form of the SensiView.class Object on the client user's local computer 24-1 display terminal 24-2. Also connected to the client user's local computer 24-1 is a mouse device 24-5. The Site Window 24-4 for the graphic image associated with a specific SiteProfile object provides a medium for the visual expression of the Virtual Sensors configured for the client site.

In turn, a comparable computer 24-8 configuration 24-7 may likewise be connected to the InterNet 24-6 and be accessible via standard InterNet 24-6 protocols for communications, such: as TCP/IP, SLIP, PPP, etc. The comparable remote computer 24-8 configuration 24-7, likewise, has a display terminal 24-9, a mouse device 24-10, a series of sensor probes 24-11 for actively acquiring data for observation and expression in real-time, and a local disk storage device 24-12 for storing the observed readings as digitized information. The Universal Resource Locator (URL) provides a means of access to any digitized information which may exist on any such disk storage device 24-12 which is thusly connected to the InterNet 24-6. The specific device drivers for the sensor probes 24-11 will determine the remote control capabilities of the specific sensor probes in a real-time mode of operation. However, such a remote configuration can always record the acquired observation reading to the local disk storage device 24-12 for later access.

Objective Formalities

Finally, it should be noted that while the above process was described with reference to the various flow charts of the present application, in essence, the various steps of the present invention were implemented by hardware computer components. Accordingly, each step of the present invention typically generates an electrical signal which represents a result of the specific step in the illustrated flow charts. Accordingly, the flow charts represent the electrical signals which are generated and used in subsequent steps of the Virtual Sensor process of the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction illustrated and described, and accordingly, all suitable modifications and equivalence may be resorted to, falling within the scope of the invention.

Standard Methods Classes

Observation

| | |
|---|---|
| omDialog | A client User dialog value specification, per reading. |
| omNewStat | A sample Object for custom Static Mode Observation Methods. |
| omNewDyAs | A sample Object for custom Dynamic Mode, Asynchronous Observation Methods. |
| omNewDySy | A sample Object for custom Dynamic Mode, Synchronous Observation Methods. |
| omRecord | { Unit record text format } |
| omTime | Null observation for timestamp generation. |
| omTH_A | { TimeStamp, xx.xx, xx.xx } format |
| omTS_IW | { TimeStamp, Int, xx.xx } format. |
| omTS_V | { TimeStamp, xx } format. |
| omTS_W | { TimeStamp, xx.xx } format. |
| omTTH_A | { HourStamp, xx.xx, xx.xx, xx.xx } format |
| omTTH_M | { TimeStamp, xx.xx, xx.xx, xx.xx } format |

Evaluation

| | |
|---|---|
| emAir | Air Flow, Circulation Deviations. |
| emDynamic | An Evaluation Method which is dynamically configured by a client User dialog. |
| emH_M | Humidity, Museum Deviations. |
| emIdentity | Null Evaluation Method. |
| emM_G | Moisture, Ground Deviations. |
| emNew | Null Evaluation Method. |
| emT_M | Temperature, Museum Deviations. |

Standard Methods Classes

Expression

Symbol Pair

| | | |
|---|---|---|
| xmAir_S | emAir, | rmAir |
| xmAir | emIdentity, | rmAir |
| xmBoxes | emIdentity, | rmBoxC |
| xmCrack | emIdentity, | rmCrack |
| xmDay | emIdentity, | rmSun |
| xmDensity | emIdentity, | rmDensity |
| xmHatch | emIdentity, | rmHatch |
| xmJiggle | emIdentity, | rmJiggle |
| xmM_S | emM_S, | rmRings |
| xmOilPan | emIdentity, | rmOilPan |
| xmPeople | emIdentity, | rmPeopB |
| xmRandom | emIdentity, | rmRandom |
| xmRings | emIdentity, | rmRings |
| xmTH_S | emT_M, | rmBoxC |
| | emH_M, | rmRings |
| xmTTH_S | emT_M, | rmBoxL |
| | emT_M, | rmBoxR |
| | emH_M, | rmRings |
| xmTube | emIdentity, | rmTube |
| xmT_S | emT_M, | rmBoxC |
| xmWeather | emIdentity, | rmRainB |

Rendering

| | |
|---|---|
| rmAir | 0 to 4 deviations for up arrows. |
| rmBoxC | 0 to 4 deviations for imploding, centered boxes. |
| rmBoxL | 0 to 4 deviations for imploding, left shifted boxes. |
| rmBoxR | 0 to 4 deviations for imploding, right shifted boxes. |
| rmCrack | 0 to 4 deviations for vertically extending triangle. |
| rmDensity | 0 to 4 deviations for grid filled rectangle. |
| rmHatch | 0 to 4 deviations for cross hatched filled rectangle. |
| rmJiggle | 0 to 4 deviations for vertically extending, jiggling mesh. |
| rmNew | A sample Object for development of custom Rendering Methods. |
| rmOilPan | 0 to 4 deviations for sparse red to dense white filled trapezoid. |
| rmPeopB | Text display of a numeric value. |
| rmRainB | 0 or 1 toggle for clear sky or jiggling raindrops. |
| rmRandom | 0 to 100 percentage randomly filled rectangle. |
| rmRings | 0 to 4 deviations for imploding concentric rings. |
| rmSun | Sun and Moon rise and set of a TimeStamp. |
| rmTube | 0 to 100 percentage filled rectangle. |

GLOSSARY OF TERMS abstract Class of Objects: An abstract Class of Objects is a Class in which methods are defined, but are not actually implemented by that Class. Such method definitions only provide formal place-holders such that subsequent Classes, which are derived from the abstract Class, must override such methods and supply their actual implementation.

actual software instantiation: An actual instance of an executable program module.

analog: The quality of a continuous flow, in contrast to the discrete quantification, of information.

array structure: A convenient form for referencing a specific element within a well defined collection of Objects which are all of the same Class.

ASCII: American Standard Codes for Information Interchange.

asynchronous access: A method of access which indicates, via a interruption of normal processing, that a target Object has entered a particular state or completed a specific task. The interruption of normal processing is handled by the EventHandler method of the Object which initiated the access.

binary: The digital representation of quantity, using the number 2 as the positional power base.

binary information: Quantative data represented in binary form.

Class: A Class is a software construct that defines the instance variables and methods of an Object. A Class in and of itself is not an Object. A Class is a template that defines how an Object will look and behave when the Object is created or instantiated from the specification declared by the Class.

Class Method: A procedure, subroutine, or series of logical steps which determine the behavior of any Object which belongs to the specific Class of the Object.

CyberSpace: The realm of virtual objects which are accessible via the Internet.

DeviationStatistic Class of Objects: An abstract Class of Objects which reflects the substantive meaning of an instance of digital information with respect to known standards of interpretation. The DeviationStatistic Class is extended by the ds_Classes to form Objects of Substance.

DeviationStatistic Object: An instance of the DeviationStatistic Class of Objects.

digital: A form of enumeration based on a positional arrangement of digits.

Dimensionality: The conventional units associated with a measure of spatial extent, mass, time, or one of a set of fundamental measures of a physical quantity.

distinction: The "Laws of Form" provided a definition as "Distinction is perfect continence" to indicate the absolute and intentional nature of drawing a distinction to indicate differentiation.

em_.Class: A shorthand notation to indicate the EvaluationMethod Class of Objects.

EvaluationMethod Class of Objects: An abstract Class of Objects which perform a series of evaluation instructions to determine the substantive meaning of an instance of digital information with respect to an interpretation. The EvaluationMethod Class is extended by the em_Classes to form Objects of substance.

EvaluationMethod Object: AN instance of the EvaluationMethod Class of Objects.

EventHandler: A standard method of Objects for processing events which may occur during the normal course of program execution, such as mouse click events, clock events, communication events, and any other such events which may be detected by the host system.

ExpressionMethod Class of Objects: An abstract Class of Objects which perform an evaluation and rendering series of instructions to express the substantive meaning of digital information. The ExpressionMethod Class is, extended by the xm_Classes to form Objects of substance.

ExpressionMethod Object: An instance of the ExpressionMethod Class of Objects.

Form: The quality of an Object which allows visual recognition of said Object.

GUI: See Graphic User Interface.

Graphic User Interface (GUI): A means of communication, for a client user to interact with a computer implemented processing mechanism, that utilizes windows, menu bars, edit controls, scrollbars, buttons, and other such graphic elements in the context of a mouse device for indication and intent.

hard-coded: A term which indicates the explicit inclusion of user dependent values and constants into the source code of a general purpose program module, method, or program.

HTML: The HyperText Markup Language.

instance: An observable or actual occurrence.

Instance Variables: The variables associated with a particular instance of an Object.

instantiate: To create an instance of.

Method: A procedure, subroutine, or series of logical steps which determine a behavior of an Object.

MIME: An acronym for Multi-purpose InterNet Mail Extension.

Moment Merge: The creation of a single TimeLine from several such TimeLines, by the merging of each moment, from each such TimeLine, into an appropriate interval of the single TimeLine.

Morphing: This term refers to any technique for the interpolation of non-numeric data to produce a smooth, continuous transition between two states.

Object: Anything which may be known or observed.

Object Class: The Class of an Object.

Object instance: A specific instance of a Class of Object.

Object-oriented: Well known examples of "Object-oriented" languages are Eiffel, SmallTalk, Objective C, C++, and Java. To be considered truly "Object-oriented", a programming language should support at a minimum four characteristics:

Encapsulation: implements information hiding and modularity (abstraction);

Polymorphism: the same message sent to different Objects results in behavior that is dependent on the nature of the object receiving the message;

Inheritance: define new Classes and behavior based on existing Classes to obtain code re-use and code organization;

Dynamic binding: Objects may come from anywhere, possibly across a network. You need to be able to send messages to Objects without having to know their specific type at the time you write your code. Dynamic binding provides maximum flexibility while a program is executing.

Observation: Observation is the necessary prelude to the sensing of meaning.

ObservationMethod Class of Objects: An abstract Class of Objects which perform an acquisition, control, and input series of instructions to observe, accept, and provide digital information for subsequent processing. The ObservationMethod Class is extended by the om_Classes to form Objects of substance.

ObservationMethod Object An instance of the ObservationMethod Class of Objects.

ObservationPeriod Class of Objects: A Class of Objects which provide a memory storage capacity for specifying a time period and data selection qualification conditions for the selection of digital information for a host system.

ObservationPeriod Object: An instance of the ObservationPeriod Class of Objects.

ObservationReadings Class of Objects: A Class of Objects which provide a memory storage capacity for the observed readings of an ObservationMethod Object.

ObservationReadings Object An instance of the ObservationReadings Class of Objects.

om_.Class: A shorthand notation to indicate the ObservationMethod Class of Objects.

op_.Class: A shorthand notation to indicate the ObservationPeriod Class of Objects.

or_.Class: A shorthand notation to indicate the ObservationReadings Class of Objects.

persistence: The property of an Object to persist in its existence, with integrity, over timed physical manifestation: The quality of an Object which allows for the physical experience and sensing of said Object.

quantitative measurement: The process of associating numerical values with the capacity, extent, duration, intensity, definition or other such dimensional property of a process or Object.

render: To make physically manifest for sensory experience in a visual, auditory, olfactory, gustatory, tactile, caloric, kinesthetic, or other manner or mode of sensory experience.

RenderingMethod Class of Objects: An abstract Class of Objects which perform a series of instructions to render an expression which conveys meaningful information. The RenderingMethod Class is extended by the rm_Classes to form Objects of substance.

RenderingMethod Objects: An instance of the Rendering-Method Class of Objects.

rm_.Class: A shorthand notation to indicate the Rendering-Method Class of Objects.

sensing: A cognitive process for the experience of meaningful substance.

sensor device: A physical device Object for sensing physical conditions.

Sensor Class of Objects: An abstract Class of Objects which provides the means to observe, evaluate and render digital information in a form which clarifies the substantive meaning of the observed conditions.

Sensor Object: An instance of the Sensor Class of Objects.

Site Profile Object: An Object which defines the visual graphics and Sensor Objects which comprise a client site installation of the SensiView products.

Substance: Any quality of an Object which allows dimensional measurement of said quality. Any such measurement carries the substance of Object, with respect to said quality, and distinguishes the said quality as a quantified property of the substance of the object.

synchronous access: A method of access which periodically and regularly polls a target Object to determine if the Object has entered a particular state or completed a specific task.

URL: See Universal Resource Locator.

Universal Resource Locator (URL): A means of accessing Objects, within the CyberSpace of the InterNet, which consists of a protocol, domain name, directory path, and file specifier.

variable: An instance of a name to reference an Object.

virtual: Existing or resulting in essence or effect though not in actual fact, form, or name. Existing in the mind, especially as a product of imagination in an intellectual realm of conscious perception.

virtual device driver: A software module which provides an interface means between an actual hardware device and an intellectual formulation of generic interactions with such a device.

window toolkit: A collection of framing, layout, and control Objects for constructing Graphic User Interface Windows.

xm_Class: A shorthand notation to indicate the Expression-Method Class of Objects.

Standard References

Incorporated Herein by Reference

Collected works of Aristotle.

"Laws of Form", G. Spencer-Brown, Allen & Unwin, 1969.

"Smalltalk-80: The Lancuace And Its Implementation", Adele Goldberg, Addison-Wesley, 1983.

"Object-Oriented Programming: An Evolutionary Approach", Brad Cox, Addison-Wesley, 1986.

"Eiffel: The Language", Bertrand Meyer, Prentice-Hall, 1992.

"The Java Programming Lanquage", Arnold Gosling, Addison-Wesley, 1996.

Appendix—The Form of the Patent Figures

A Distinction of Objects

Taking

as a representation of the Initials of the Primary Arithmetic of the Calculus of Indications; and Taking the bounds of a blank sheet, used for rendering visual Forms, as representing the medium of CyberSpace;

Then a single distinction,

as a closed curve which severs CyberSpace, and which declares an instance of a Virtual Object in CyberSpace, is represented as:

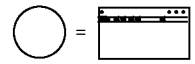

namely, an actual Graphic User Interface, as the Form of a CyberSpace Window Frame Object.

A Further Distinction

A further Form of distinction distinguishes the Form of the CyberSpace Object as having an External Form of the Object which is visible, and, an Internal Form as that which is not.

The External Form of the Object is seen as the GUI Window Frame, because it is visible.

The Internal Form of a CyberSpace Window Object, for all Classes of Objects, is visualized as:

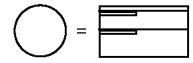

Clearly, the Internal Form of an Object must likewise be distinct from the remainder of CyberSpace, and, thus, this visual Form conforms as a strong analog.

However, for a strong formal analogy of conforming Forms, the Internal Form is formally not visible.

This difficulty is immediately resolved by noting that this further Form of distinction,

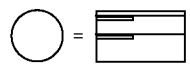

is drawn within the CyberSpace Object itself, i.e.,

which immediately reduces as

which is clearly not visible.

The Formal Distinction

Thus, the Form of the Patent Figures provides a non-numerical calculus of Forms which forms a strong formal analogy to the Initials of the Primary Arithmetic of the Calculus of Indications.

As a medium of communication, CyberSpace allows the free flow of information among the Variables and Methods of each Virtual Object.

Any such communication between two Virtual Objects is a distinct Object in CyberSpace, and is represented as a line connecting the source and destination of the communication.

Thus, it is natural for a line of communication, rendered in CyberSpace, to crossover and "white-out" any double-lined Internal Object Form representation, because the Internal Form is not really, only actually, visible, as represented by the distinction within the object, i.e.,

We claim:

1. A computer architecture for a Virtual Sensor object for expressing the substantive meaning of a collection of observation readings of a Virtual Sensor which is represented as digitized information, comprising:

Virtual Sensor Object generation means for the instantiation, interaction, and management of Virtual Sensor Objects;

Virtual Sensor Object observation means for physical control and acquisition, via a local host computer or via a Universal Resource Locator (URL) accessible via the Internet or the World Wide Web in either a static access mode or a dynamic access mode, said Virtual Sensor Object observation means operating in either an asynchronous or a synchronous manner, and for subsequent reduction, conversion, normalization, transformation, storage, retrieval, and administrative management of collections of the digitized information which represent readings of a phenomena by at least one of the Virtual Sensor Objects generated by said virtual Sensor Object generation means;

Virtual Sensor Object expression means for expression or physical manifestation of a substantive meaning of said digitized information received from said Virtual Sensor Object observation means by evaluating, transforming, and rendering said digitized information into a form which clarifies the substantive meaning of said digitized information, and requires relatively no cognitive interpretation beyond recognition of the expression expressed by said Virtual Sensor Object expression means;

Virtual Sensor Object animation means for presentation of, or for driving the presentation of, the substantive meaning of said digitized information received from said Virtual Sensor Object observation means and expressed by said Virtual Sensor Object expression means for a set of said Virtual Sensor Objects over time, wherein the Virtual Sensor Object is hardware independent with respect to at least one of platform, signal generation, storage capability and communication capability.

2. A computer architecture as recited in claim 1, wherein the phenomena is physically observable or virtually conceivable.

3. A computer architecture as recited in claim 1, wherein the readings of the phenomena provide characteristics of the phenomena.

4. A computer architecture as recited in claim 1, wherein the Virtual Sensor Object comprises a plurality of Virtual Sensor Objects, and wherein the computer architecture further comprises a Graphic User Interface for the creation, storage, and management of said Virtual Sensor Object, and a Site Profile Object for a specific Site as a complex collection of said Virtual Sensor Objects, said Graphical User Interface being located at a local host computer, or at a Universal Resource Locator (URL) accessible via the Internet or the World Wide Web, with respect to the specific Site of the Virtual Sensor.

5. A computer architecture as recited in claim 4, wherein the Graphic User Interface comprises a canonical user interface.

6. A computer architecture as recited in claim 4, wherein said Graphic User Interface provides Object management methods for creation, modification, documentation, storage, and disposal of said Site Profile Object, wherein said Graphic User Interface provides Object management methods for administration, generation, modification, and disposal of said Virtual Sensor Object, wherein said Graphic User Interface provides controls for client user interactivity and an appropriate device medium of expression for sequential and discrete expression of the phenomena represented by said digitized information, wherein said Graphic User Interface provides controls for client user interactivity and an appropriate device medium of expression for the sequential and discrete expression of the phenomena represented by said digitized information, wherein said Graphic User Interface provides transport for said digitized information, said Virtual Sensor Object and related component Objects, via protocols of the Internet and the World Wide Web.

7. A computer architecture as recited in claim 1, further comprising an Observation Method Object, which either statically or dynamic ally instantiates a Readings Object with the digitized information for said Virtual Sensor Object.

8. A computer architecture as recited in claim 7, wherein said Readings Object is instantiated via retrieval from a data base structure via user specification of selection criteria and use of appropriate data base access, selection, and retrieval means, wherein said Readings object is instantiated synchronously via the Observation Method Object with an internal, independent time thread means, wherein said Readings Object is instantiated asynchronously via the Observation Method Object with an interrupt event handler means.

9. A computer architecture as recited in claim 7, further comprising an ExpressionMethod Object which evaluates and renders a physical symbol for the substantive meaning of said digitized information contained within said Readings Object for said Virtual Sensor Object.

10. A computer architecture as recited in claim 9, wherein the evaluation function of said ExpressionMethod Object is performed by the methods of a EvaluationMethod Object which is appropriate for the phenomena represented by said digitized information, and returns a DeviationStatistic Object to describe a result of the evaluation, wherein the rendition function of said ExpressionMethod object is performed on said Deviation Statistic Object via a RenderingMethod Object, which manifests a physical expression that is appropriate for the phenomena represented by said digitized information, wherein said ExpressionMethod Object provides utility Control Objects which may be used as Graphic User Interface Components for the construction of a Graphic User Interface for the rendering of the physical expression of the phenomena represented by said digitized information.

11. A computer architecture as recited in claim 10, wherein said Virtual Sensor Objects are managed independently of said ExpressionMethod Object and said RenderingMethod Object.

12. A computer architecture as recited in claim 1, wherein said Virtual Sensor Objects are functional and independent from said Virtual Sensor Object generation means, said Virtual Sensor Object observation means, said Virtual Sensor Object expression means, and said Virtual Sensor Object animation means.

13. A computer architecture as recited in claim 1, wherein said Virtual Sensor Objects are hardware independent, and included as an abstracted system of observer and expression classes.

14. A tangible medium for storing a Virtual Sensor Object, the Virtual Sensor Object providing instructions for execution by a computer to record readings from a Virtual Sensor, comprising:

an Observation Method Object to provide static and dynamic modes of access for digitized information, in a variety of forms, layouts, and formats;

an ExpressionMethod Object to provide expression of a substantive meaning of said digitized information;

an EvaluationMethod Object to provide evaluation of the substantive meaning of said digitized information;

a RenderingMethod Object to provide rendering of a physical manifestation of symbols which indicate the substantive meaning of said digitized information responsive to the evaluation;

a Site Profile object of client information to define a client Site, appropriate client Site graphic images, and deployment of said Virtual Sensor at the client Site;

a Graphic User Interface to provide client user interaction with said client Site of said Virtual Sensor to define, modify and delete said Virtual Sensor Object to control, acquire, observe, and express said digitized information, in the context of a local host computer, or in the context of the Internet and the World Wide Web, wherein the Virtual Sensor Object is hardware independent with respect to at least one of platform, signal generation, storage capability and communication capability.

15. A tangible medium as recited in claim 14, wherein said Virtual Sensor Object is functional and independent from sensor management and sensor control.

16. A tangible medium as recited in claim 14, wherein said ExpressionMethod Object is managed independently of said EvaluationMethod Object and said RenderingMethod Object.

17. A tangible medium as recited in claim 14, wherein said Virtual Sensor Object is hardware independent, and included as an abstracted system of observer and expression classes.

18. A computer implemented method of expressing observations of a sensor as a Virtual Sensor Object which is hardware independent with respect to at least one of platform, signal generation, storage capability and communication capability, comprising the steps of:

(a) recording a reading value of the sensor as digitized information accessed by a Universal Resource Locator (URL) via t he Internet;

(b) evaluating said reading value responsive to a distribution of expected reading values;

(c) determining a number of deviations from normal responsive to said distribution;

(d) rendering an expression responsive to the number of deviations.

19. A computer implemented method according to claim 18, wherein said steps (a)–(d) are performed remotely from each other.

20. A computer implemented method according to claim 18, wherein said steps (b) and (c) fare performed remotely from each other.

21. A computer implemented method according to claim 18, wherein at least two of said steps (a)–(d) are performed remotely from each other.

22. A method as recited in claim 18, wherein said Virtual Sensor Object is functional and independent from sensor management and sensor control processes.

23. A method as recited in claim 18, wherein said Virtual Sensor Object is managed independently of said rendering step (d).

24. A method as recited in claim 18, herein said Virtual Sensor Object is hardware independent, and is included as an abstracted system of observer and expression classes.

25. An interactive computer implemented method of initiating and editing a Virtual Sensor Object for expressing a substantive meaning of a collection of observation readings of a Virtual Sensor, the Virtual Sensor Object being hardware independent with respect to at least one of platform, signal generation, storage capability and communication capability comprising the steps of:

(a) assigning a Virtual Sensor utilizing the Virtual Sensor Object to a predetermined location of a display screen responsive to a mapping of the layout of remotely located physical sensors used to physically collect the observation readings;

(b) optionally copying the Virtual Sensor to another location of the display screen responsive to the mapping of the layout of the physical sensors used to physically collect: the observation readings;

(c) assigning the Virtual Sensor a virtual communication line for receiving data from a device driver of the physical sensor in real-time representing dynamic information collected by the physical sensor, or from a storage device associated with the physical sensor representing static information collected by the physical sensor;

(d) initiating the Virtual Sensor by selectively assigning the Virtual Sensor a transmission criteria indicating how often the Virtual Sensor is to retrieve the static information or accept the dynamic information for processing.

26. A tangible medium for storing a Virtual Sensor Object, the Virtual Sensor Object providing instructions for execution by a computer to record readings from a Virtual Sensor, comprising:

- an ObservationMethod Object to provide static and dynamic modes of access for digitized information;
- an ExpressionMethod Object to provide expression of a substantive meaning of said digitized information;
- an EvaluationMethod Object to provide evaluation of the substantive meaning of said digitized information;
- a RenderingMethod Object to provide rendering of a physical manifestation indicative the substantive meaning of said digitized information responsive to the evaluation;
- a Site Profile object of client information to define a client Site and deployment of said Virtual Sensor at the client Site;
- a Graphic User Interface to provide client user interaction with said client Site of said Virtual Sensor to provide instructions for said Virtual Sensor Object to control, acquire, observe, and express said digitized information, in the context of a local host computer, or in the context of the Internet and the World Wide Web, wherein the Virtual Sensor Object is hardware independent with respect to at least one of platform, signal generation, storage capability and communication capability.

27. A tangible medium for storing a Virtual Sensor Object, the Virtual Sensor Object providing object-oriented instructions for execution by a computer to record readings from a Virtual Sensor, the Virtual Sensor Object being an instance of a class of Virtual Sensors, said object-oriented instructions comprising:

- an ObservationMethod Object including a definition of at least one of observation characteristics and functions to provide static and dynamic modes of access for digitized information, in a variety of forms, layouts, and formats;
- an ExpressionMethod Object including a definition of at least one of expression characteristics and functions to provide expression of a substantive meaning of said digitized information;
- an EvaluationMethod Object including a definition of at least one of evaluation characteristics and functions to provide evaluation of the substantive meaning of said digitized information, wherein the Virtual Sensor Object is hardware independent with respect to at least one of platform, signal generation, storage capability and communication capability.

\* \* \* \* \*